United States Patent
Matsumoto et al.

(10) Patent No.: US 10,759,233 B2
(45) Date of Patent: Sep. 1, 2020

(54) PNEUMATIC TIRE

(71) Applicant: SUMITOMO RUBBER INDUSTRIES, LTD., Kobe-shi, Hyogo (JP)

(72) Inventors: Tadao Matsumoto, Kobe (JP); Yasutaka Iwata, Kobe (JP); Kentaro Yagyu, Kobe (JP); Fumikazu Yamashita, Kobe (JP); Shingo Umekita, Kobe (JP); Yasuaki Kuniyasu, Kobe (JP); Hiroaki Ninomiya, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 396 days.

(21) Appl. No.: 15/508,682

(22) PCT Filed: Sep. 3, 2015

(86) PCT No.: PCT/JP2015/075029
§ 371 (c)(1),
(2) Date: Mar. 3, 2017

(87) PCT Pub. No.: WO2016/035840
PCT Pub. Date: Mar. 10, 2016

(65) Prior Publication Data
US 2017/0274710 A1    Sep. 28, 2017

(30) Foreign Application Priority Data

Sep. 4, 2014  (JP) ................. 2014-179768
Sep. 29, 2014 (JP) ................. 2014-198131
Sep. 29, 2014 (JP) ................. 2014-198495

(51) Int. Cl.
 B60C 15/06    (2006.01)
 B60C 15/00    (2006.01)
 (Continued)

(52) U.S. Cl.
 CPC ........ B60C 15/0603 (2013.01); B60C 9/2204 (2013.01); B60C 15/0018 (2013.01);
 (Continued)

(58) Field of Classification Search
 CPC .................................................. B60C 15/06
 See application file for complete search history.

(56) References Cited

U.S. PATENT DOCUMENTS 6,260,598 B1 *   7/2001   Tanaka ................... B60C 9/023
                                                              152/548
6,520,760 B1 *   2/2003   Canevini ............ B29D 30/0629
                                                              152/454
(Continued)

FOREIGN PATENT DOCUMENTS

EP     3 112 189 A1      1/2017
JP     H0399903 A   *    4/1991
(Continued)

OTHER PUBLICATIONS

Epo Search Report Application No. 15838987.4, dated 9/28/18 (Year: 2018).*

(Continued)

*Primary Examiner* — Alison L Hindenlang
*Assistant Examiner* — George W. Brady
(74) *Attorney, Agent, or Firm* — Birch, Stewart, Kolasch & Birch, LLP

(57)    ABSTRACT

In the tire 2, fillers 10 are layered over clinches 8 in portions outward of a carcass 14 in the axial direction. A carcass ply 50 is turned up around cores 44. Turned-up portions 50a are disposed between the fillers 10 and apexes 46. Each clinch (Continued)

8 has a maximum thickness Tcx that is measured along a line normal to an inner surface, in the axial direction, of the clinch 8. A ratio of a thickness Tf1 of the filler 10 to a sum of the thickness Tf1 and the thickness Tcx is greater than or equal to 0.1 and not greater than 0.6. A percentage of a complex elastic modulus E*f of the filler 10 relative to a complex elastic modulus E*a of the apex 46 is greater than or equal to 70% and not greater than 125%.

15 Claims, 8 Drawing Sheets

(51) Int. Cl.
B60C 9/22 (2006.01)
B29D 30/72 (2006.01)
B29D 30/48 (2006.01)

(52) U.S. Cl.
CPC ........ B60C 15/06 (2013.01); *B29D 2030/486* (2013.01); *B29D 2030/724* (2013.01); *B60C 2009/2223* (2013.01); *B60C 2015/0614* (2013.01); *B60C 2015/0617* (2013.01); *B60C 2015/0621* (2013.01); *B60C 2015/0625* (2013.01)

(56) References Cited

U.S. PATENT DOCUMENTS

| | | | | |
|---|---|---|---|---|
| 7,461,679 | B2* | 12/2008 | Maruoka | B60C 15/0027 152/450 |
| 2002/0043320 | A1* | 4/2002 | Wada | B60C 15/06 152/539 |
| 2005/0126675 | A1* | 6/2005 | Maruoka | B60C 15/0027 152/543 |
| 2010/0032071 | A1* | 2/2010 | Miyazaki | B60C 1/0025 152/525 |
| 2012/0285606 | A1* | 11/2012 | Adachi | B29D 30/1628 156/130.5 |
| 2013/0048185 | A1* | 2/2013 | Harikae | B60C 9/2006 152/527 |
| 2013/0056126 | A1 | 3/2013 | Ueyoko et al. | |
| 2015/0336424 | A1* | 11/2015 | Ferigo | B60C 3/04 152/454 |

FOREIGN PATENT DOCUMENTS

| | | | |
|---|---|---|---|
| JP | 3138404 | B2 | 2/2001 |
| JP | 2004-224277 | A | 8/2004 |
| JP | 2006-213241 | A | 8/2006 |
| JP | 2007-045333 | A | 2/2007 |
| JP | 2007045333 | A * | 2/2007 |
| JP | 2007-210363 | A | 8/2007 |
| JP | 2008-168702 | A | 7/2008 |
| JP | 2011-011429 | A | 1/2011 |
| JP | 2012-025280 | A | 2/2012 |
| JP | 2013-056659 | A | 3/2013 |
| JP | 2013-103478 | A | 5/2013 |
| JP | 2013-147065 | A | 8/2013 |
| WO | WO 2015/129595 | A1 | 9/2015 |

OTHER PUBLICATIONS

International Search Report (PCT/ISA/210) issued in PCT/JP2015/075029, dated Nov. 10, 2015.

Written Opinion (PCT/ISA/237) issued in PCT/JP2015/075029, dated Nov. 10, 2015.

* cited by examiner

PNEUMATIC TIRE

TECHNICAL FIELD

The present invention relates to pneumatic tires. Specifically, the present invention relates to pneumatic tires for small trucks.

BACKGROUND ART

Tires support a vehicle body. The tires are under a load. Thus, flexure occurs in the tire. The maximum load capacity of one tire in the supporting is represented as an index. As the index, a load index is known. The load index is defined in the JATMA standard. The load index is an index that represents the maximum weight that is allowed to be applied to a tire in a specified condition.

A truck runs in a state where the truck is loaded with a cargo. A truck runs in a state where the truck is loaded with a cargo that is approximately equivalent to the maximum loading capacity in some cases. In this case, the tire is under a load equivalent to the load index. Thus, in the tire, flexure is great in bead portions thereof. The great flexure causes strain. The strain tends to concentrate on a boundary between a carcass and an apex, the end of the apex, and a boundary between the carcass and a clinch. The concentration of the strain may cause damage such as loosening.

Strain, i.e., deformation causes heat generation. Large deformation increases heat generation. Therefore, in a portion in which strain is large, not only mechanical degradation but also thermal degradation may progress.

Reduction of flexure contributes to durability. In this viewpoint, volume of components, such as clinches and apexes, of bead portions is increased in some cases. However, in this case, a problem arises that the tire becomes heavy and, further, cost is increased.

In general, in a carcass of a tire, a carcass ply is turned up around beads. Thus, the carcass ply has turned-up portions. The turned-up portions contribute to stiffness of the bead portions.

When flexure occurs in the tire, force in a compressing direction acts in the outer side portion in the bead portion, and force in a tensile direction acts in the inner side portion therein. The turned-up portions are disposed in the outer side portions, whereby the turned-up portions are compressed. This compression is likely to cause separation of cords included in the turned-up portions. The loosening may start from the separation of the cords.

From the viewpoint of controlling of stiffness in bead portions, the structure in the portions is variously studied. An example of the study for the structure is disclosed in JP2007-210363 and JP2012-025280.

When a truck runs, deformation and restoration are repeated in the tire. Thus, heat generation occurs in the tire. As described above, large deformation increases heat generation. By the running, a temperature rises in the tire for a truck.

In a case where the truck is parked after running, deformation of the tire due to load persists. In this state, the tire is cooled. Thus, deformation may be fixed. Even if the load becomes zero, restoration from the deformation does not occur. The deformation is referred to as flat spot. In the tire in which the flat spot is generated, vibration occurs during running. The tire is poor in ride comfort.

A main cause of generation of a flat spot is that an apex of a bead is fixed in a deformed state, and a cord of a band contracts due to heat. When volume of rubber of the apex is reduced, improvement may be performed so that the flat spot is reduced. However, this may reduce stiffness of the bead portions. This reduces durability of the tire and ride comfort. Further, when the band is changed from a full band to edge bands to reduce an amount of the cord, improvement can be performed so that the flat spot is reduced. However, reduction in an amount of the cord reduces a force with which the band holds a belt. This may cause "tread separation" in which the surface of the tread is separated. The tire is poor in high-speed durability.

An example of study for reducing generation of flat spot is disclosed in JP2008-168702. In the tire, by positions of the ends of a belt and the ends of a band being adjusted, generation of flat spot is reduced.

A pneumatic tire is mounted on a rim and used. When the tire is mounted on the rim, the bead portions of the tire are fitted to the rim. Air is filled inside the tire. By the air filled thereinside, the bead portions slide outward in the axial direction along a seat surface of the rim. By the sliding, the bead portions come into contact with flanges of the rim, and are disposed at appropriate positions. Thus, the filling with air and disposing the bead portions at appropriate positions relative to the rim is referred to as air-in. The paired bead portions come into contact with the bead flanges, respectively, and mounting of the tire on the rim is then completed. A distance between the paired bead portions prior to the tire being mounted on the rim is increased relative to a distance between the paired rim flanges, whereby the air-in performance can be enhanced.

In a case where a distance between paired bead portions is increased in a tire, when the tire is mounted on a rim, the paired bead portions are moved inward in the axial direction. The bead portions are deformed by the movement. By filling with air, the bead portions are further deformed. In the tire, a tire profile is greatly changed. The tire is mounted to a vehicle, and is under a load. Due to the load, deformation of the bead portions is further increased. In the tire, deformation is large around the bead portions. In particular, in a tire in which a distance between bead portions is increased relative to the tread width or the tire maximum width, strain is high around the bead portions. In the tire, loosening is likely to occur between the beads and a carcass. The tire tends to be poor in durability.

Durability of the tire can be improved by stiffness of the bead portions being improved. By volume of rubber being increased, stiffness of the bead portions may be improved. Further, a carcass structure which has the apparently increased number of carcass plies of the carcass to contribute to stiffness, for example, an HTU structure (highly turned-up structure) may improve stiffness.

CITATION LIST

Patent Literature

Patent Literature 1: JP2007-210363
Patent Literature 2: JP2012-025280
Patent Literature 3: JP2008-168702
Patent Literature 4: JP2011-11429

SUMMARY OF THE INVENTION

Problems to be Solved by the Invention

The tire disclosed in JP2007-210363 includes second bead fillers disposed outward of a carcass in the axial direction. In the tire, turned-up portions are disposed at positions at which force in a compressing direction is less likely to act. However, in the tire, the second bead fillers are much more flexible than first bead fillers. Therefore, in a case where the tire is under a load equivalent to a load index, flexure may become great in the bead portions. Great flexure exerts influence on durability of the tire.

The tire disclosed in JP2012-025280 includes second stiffeners disposed outward of a carcass in the axial direction. In the tire, turned-up portions are disposed at positions at which force in a compressing direction is less likely to act. However, in the tire, the second stiffener has a thickness that is much greater than a thickness of a portion outward of the second stiffener in the axial direction. By the second stiffeners having the great thickness, stiffness is excessively increased in the bead portions. In this case, although flexure is reduced, a position at which strain occurs is shifted. Therefore, other damage may occur depending on the position at which strain occurs. It is difficult to improve durability while controlling the position at which strain occurs, by using the techniques disclosed therein.

Further, performance for reducing the flat spot is required to be improved. As described above, a main cause of the flat spot is deformation of an apex and contraction of a cord of a band. It is important to inhibit both of them while high durability and ride comfort are maintained. Hitherto, such a tire has not been reported.

Increase of volume of rubber causes increase of the weight of a tire and increase of production cost. Further, also in a case where the carcass has an HTU structure in which the number of carcass plies is apparently increased, the weight of the tire and production cost are increased.

An object of the present invention is to provide a pneumatic tire that has improved durability. Another object of the present invention is to provide a pneumatic tire in which generation of flat spot is prevented while high durability and ride comfort are maintained. Still another object of the present invention is to provide a pneumatic tire that is excellent in durability and air-in performance while inhibiting increase of weight and increase of production cost.

Solution to the Problems

A pneumatic tire according to the present invention includes: a tread; a pair of sidewalls; a pair of clinches; a pair of fillers; a pair of beads; and a carcass. The sidewalls extend almost inward from ends, respectively, of the tread in a radial direction. The clinches are disposed inward of the sidewalls, respectively, in the radial direction. The fillers are disposed inward of the clinches, respectively, in an axial direction. The beads are disposed inward of the fillers, respectively, in the radial direction. The carcass is extended on and between one of the beads and the other of the beads along inner sides of the tread and the sidewalls. The fillers are layered over the clinches in portions outward of the carcass in the axial direction. The beads include cores and apexes that extend outward from the cores, respectively, in the radial direction. The carcass includes a carcass ply. The carcass ply is turned up around the cores from an inner side toward an outer side in the axial direction. By the turning-up, the carcass ply has a main portion and turned-up portions. The turned-up portions are disposed between the fillers and the apexes. Each clinch has a maximum thickness Tcx that is measured along a line normal to an inner surface, in the axial direction, of the clinch. When the normal line for the thickness Tcx is a first reference line, a ratio of a thickness Tf1, of the filler, measured along the first reference line to a sum of the thickness Tf1 and the thickness Tcx is greater than or equal to 0.1 and not greater than 0.6. A percentage of a complex elastic modulus $E^*f$ of each filler relative to a complex elastic modulus $E^*a$ of each apex is greater than or equal to 70% and not greater than 125%.

Preferably, in the pneumatic tire, each filler has a maximum thickness Tfx that is measured along a line normal to the inner surface, in the axial direction, of the clinch. When the normal line for the thickness Tfx is a second reference line, a ratio of a length, in the radial direction, from an inner end of the filler to a point of intersection of the second reference line and the inner surface, in the axial direction, of the clinch, relative to a length, in the radial direction, from the inner end of the filler to a point of intersection of the first reference line and the inner surface, in the axial direction, of the clinch, is greater than or equal to 0.6 and not greater than 1.2.

Preferably, in the pneumatic tire, a percentage of a complex elastic modulus $E^*c$ of the clinch relative to the complex elastic modulus $E^*f$ of the filler is greater than or equal to 70% and not greater than 125%.

Preferably, in the pneumatic tire, a thickness, of the tire, measured along the first reference line is greater than or equal to 10 mm and not greater than 20 mm.

Another pneumatic tire according to the present invention includes: a tread; a pair of sidewalls; a pair of clinches; a pair of fillers; a pair of beads; a carcass; and a band. The sidewalls extend almost inward from ends, respectively, of the tread in a radial direction. The clinches are disposed inward of the sidewalls, respectively, in the radial direction. The fillers are disposed inward of the clinches, respectively, in an axial direction. The beads are disposed inward of the fillers, respectively, in the radial direction. The carcass is extended on and between one of the beads and the other of the beads along inner sides of the tread and the sidewalls. The fillers are layered over the clinches in portions outward of the carcass in the axial direction. The band is disposed inward of the tread in a portion outward of the carcass in the radial direction. The beads include cores and apexes that extend outward from the cores, respectively, in the radial direction. The carcass includes a carcass ply. The carcass ply is turned up around the cores from an inner side toward an outer side in the axial direction, and, by the turning-up, the carcass ply has a main portion and turned-up portions. The turned-up portions are disposed between the fillers and the apexes. A percentage of a complex elastic modulus $E^*f$ of each filler relative to a complex elastic modulus $E^*a$ of each apex is greater than or equal to 70% and not greater than 125%. The band is formed by a tape, having a cord which extends in a length direction, being helically wound, and, on a cross-section obtained by cutting at a plane perpendicular to a circumferential direction of the tire, cross-sections of the tape are aligned in the axial direction. Gaps are formed between the cross-sections, of the tape, adjacent to each other.

Preferably, a width TW of the tape is greater than or equal to 9 mm and not greater than 15 mm, and a width TD of each gap is greater than or equal to 3 mm and not greater than 9 mm.

Preferably, each clinch has a maximum thickness Tcx that is measured along a line normal to an inner surface, in the axial direction, of the clinch. When the normal line for the thickness Tcx is a first reference line, a ratio of a thickness Tf1, of the filler, measured along the first reference line, to a sum of the thickness Tf1 and the thickness Tcx, is greater than or equal to 0.1 and not greater than 0.6.

Preferably, each filler has a maximum thickness Tfx that is measured along a line normal to the inner surface, in the axial direction, of the clinch. When the normal line for the thickness Tfx is a second reference line, a ratio of a length, in the radial direction, from an inner end of the filler to a point of intersection of the second reference line and the inner surface, in the axial direction, of the clinch, relative to a length, in the radial direction, from the inner end of the filler to a point of intersection of the first reference line and the inner surface, in the axial direction, of the clinch, is greater than or equal to 0.6 and not greater than 1.2.

Preferably, a percentage of a complex elastic modulus E*c of the clinch relative to the complex elastic modulus E*f of the filler is greater than or equal to 70% and not greater than 125%.

Preferably, a thickness, of the tire, measured along the first reference line is greater than or equal to 10 mm and not greater than 20 mm.

Still another pneumatic tire according to the present invention includes: a tread; a pair of sidewalls; a pair of clinches; a pair of fillers; a pair of beads; and a carcass. The sidewalls extend almost inward from ends, respectively, of the tread in a radial direction. The clinches are disposed inward of the sidewalls, respectively, in the radial direction. The fillers are disposed inward of the clinches, respectively, in an axial direction. The fillers are layered over the clinches in portions outward of the carcass in the axial direction. An inner surface, in the axial direction, of each filler is curved so as to project inward. The beads are disposed inward of the fillers, respectively, in the radial direction. The beads include cores and apexes that extend outward from the cores, respectively, in the radial direction. The carcass is extended on and between one of the beads and the other of the beads along inner sides of the tread and the sidewalls. The carcass includes a carcass ply. The carcass ply is turned up around the cores from an inner side toward an outer side in the axial direction. By the turning-up, the carcass ply has a main portion and turned-up portions. The turned-up portions are disposed between the fillers and the apexes. Each clinch has a maximum thickness Tcx that is measured along a line normal to an inner surface, in the axial direction, of the clinch. When the normal line for the thickness Tcx is a first reference line, a point PF of intersection of the first reference line and the inner surface, in the axial direction, of the filler is disposed axially inward of a mid-point of a thickness TA, of the tire, measured on the first reference line. In a mold used for obtaining the tire by vulcanization-molding, a ratio of a clip width Wc1 of the mold to a maximum width Wm1 of the mold is greater than or equal to 0.80 and not greater than 0.90. A ratio of the clip width Wc1 of the mold to a tread width Wt1 of the mold is greater than or equal to 0.95 and not greater than 1.10.

Preferably, the thickness TA is greater than or equal to 10 mm and not greater than 20 mm.

Preferably, a length La of the apex is greater than or equal to 5 mm and not greater than 20 mm.

Preferably, a ratio of a thickness Tf1, of the filler, measured along the first reference line, to a sum of the thickness Tcx and the thickness Tf1 is greater than or equal to 0.1 and not greater than 0.6.

Preferably, a percentage of a complex elastic modulus E*f of each filler relative to a complex elastic modulus E*a of each apex is greater than or equal to 70% and not greater than 125%.

Preferably, each filler has a maximum thickness Tfx that is measured along a line normal to the inner surface, in the axial direction, of the clinch. When the normal line for the thickness Tfx is a second reference line, a ratio of a length, in the radial direction, from an inner end of the filler to a point of intersection of the second reference line and the inner surface, in the axial direction, of the clinch, relative to a length, in the radial direction, from the inner end of the filler to a point of intersection of the first reference line and the inner surface, in the axial direction, of the clinch, is greater than or equal to 0.6 and not greater than 1.2.

Preferably, a percentage of a complex elastic modulus E*c of the clinch relative to the complex elastic modulus E*f of the filler is greater than or equal to 70% and not greater than 125%.

Still another pneumatic tire according to the present invention includes: a tread; a pair of sidewalls; a pair of clinches; a pair of fillers; a pair of beads; and a carcass. The sidewalls extend almost inward from ends, respectively, of the tread in a radial direction. The clinches are disposed inward of the sidewalls, respectively, in the radial direction. The fillers are disposed inward of the clinches, respectively, in an axial direction. The fillers are layered over the clinches in portions outward of the carcass in the axial direction. An inner surface, in the axial direction, of each filler is curved so as to project inward. The beads are disposed inward of the fillers, respectively, in the radial direction. The beads include cores and apexes that extend outward from the cores, respectively, in the radial direction. The carcass is extended on and between one of the beads and the other of the beads along inner sides of the tread and the sidewalls. The carcass includes a carcass ply. The carcass ply is turned up around the cores from an inner side toward an outer side in the axial direction. By the turning-up, the carcass ply has a main portion and turned-up portions. The turned-up portions are disposed between the fillers and the apexes. Each clinch has a maximum thickness Tcx that is measured along a line normal to an inner surface, in the axial direction, of the clinch. When the normal line for the thickness Tcx is a first reference line, a point PF of intersection of the first reference line and the inner surface, in the axial direction, of the filler is disposed axially inward of a mid-point of a thickness TA, of the tire, measured on the first reference line. A ratio of an initial clip width Wc to an initial tread width Wt is greater than or equal to 0.90 and not greater than 1.00 before the tire is mounted on a rim.

Advantageous Effects of the Invention

In the pneumatic tire according to the present invention, the fillers are disposed between the carcass and the clinches. In the tire, the turned-up portions of the carcass are disposed near the inner surface of the tire. In the tire, force in a compressing direction is prevented from acting in the turned-up portions. In the tire, the carcass is less likely to be damaged. Further, in the tire, the carcass is sufficiently tensioned. The carcass contributes to stiffness. Therefore, even if the tire is under a load equivalent to a load index, flexure in the bead portion is reduced. Reduction of flexure inhibits concentration of strain and heat generation. In the tire, the bead portions are less likely to be damaged.

In the tire, a percentage of the complex elastic modulus E*f of the filler relative to the complex elastic modulus E*a of the apex is appropriately adjusted. In the tire, the fillers are not excessively flexible. The fillers contribute to reduction of flexure. Reduction of flexure inhibits concentration of strain and heat generation. In the tire, the fillers are not excessively hard. Difference between stiffness of the fillers and stiffness of the apexes is reduced, whereby strain is less likely to concentrate on the turned-up portions disposed between the fillers and the apexes. In the tire, the bead portions are less likely to be damaged.

In the tire, by the thickness of the filler being controlled, a degree of flexure in the bead portion and a position at which strain occurs due to the flexure, are adjusted. In the tire, the bead portions are less likely to be damaged.

Thus, in the tire, the bead portions are effectively prevented from being damaged. The tire is excellent in durability. Further, in the tire, increase of volumes of the clinches, the apexes, and the like or addition of new components, for improving durability, need not be performed. According to the present invention, a pneumatic tire that has improved durability can be obtained without increasing weight and cost.

In another pneumatic tire according to the present invention, the fillers are disposed between the carcass and the clinches. In the tire, the turned-up portions of the carcass are disposed near the inner surface of the tire. In the tire, the carcass is sufficiently tensioned. The carcass contributes to stiffness. Therefore, even if the tire is under a load equivalent to a load index, strain in the bead portion is reduced. Deformation of the apex is reduced. Further, in the tire, a ratio ($E^*f/E^*a$) of the complex elastic modulus $E^*f$ of the filler to the complex elastic modulus $E^*a$ of the apex is appropriately adjusted. The fillers further inhibit deformation of the apexes. In the tire, flat spot due to the apex being fixed in a deformed state is reduced as compared to conventional tires. Further, the ratio ($E^*f/E^*a$) is appropriately adjusted, whereby stiffness in the bead portion is appropriately maintained. This contributes to good ride comfort. In the tire, flat spot due to the apex being fixed in a deformed state is reduced while good ride comfort is maintained.

The structure of the beads allows pliable flexure of the entirety of the tire. Strain is prevented from partially concentrating in the tire. Heat generation is prevented from being partially increased in the tire. Also in the tread, heat generation is inhibited from partially occurring. This contributes to improvement of high-speed durability in the tread. Thus, the cords of the band can be reduced without reducing high-speed durability. In the tire, gaps are each formed between cross-sections, of the tape, adjacent to each other, on the cross-section obtained by cutting at a plane perpendicular to the circumferential direction, whereby the cords of the band is reduced as compared to conventional tires. This inhibits flat spot due to the cords of the band from occurring. Further, in the tire, heat generation is prevented from partially occurring in the tread. Therefore, contraction of the cords is prevented from being partially increased. In the tire, flat spot due to contraction of the cords of the band is reduced.

In the tire, by combination of the structure of the bead portions and the structure of the band with each other, flat spot is prevented while good ride comfort and durability are maintained.

In still another pneumatic tire according to the present invention, the clip width relative to the tread width represents a predetermined value. The tire is excellent in air-in performance. Meanwhile, the fillers are disposed between the carcass and the clinches. In the tire, the turned-up portions of the carcass are disposed near the inner surface, in the axial direction, of the tire. In the tire, the carcass is sufficiently tensioned. The carcass contributes to improvement of stiffness, whereby strain in the bead portion is reduced. Deformation of the apex is reduced. The tire is excellent in air-in performance and is excellent also in durability while increase of weight and production cost is inhibited.

DESCRIPTION OF EMBODIMENTS

The following will describe in detail the present invention based on preferred embodiments with reference where appropriate to the accompanying drawing.

First Embodiment

Figure 1:
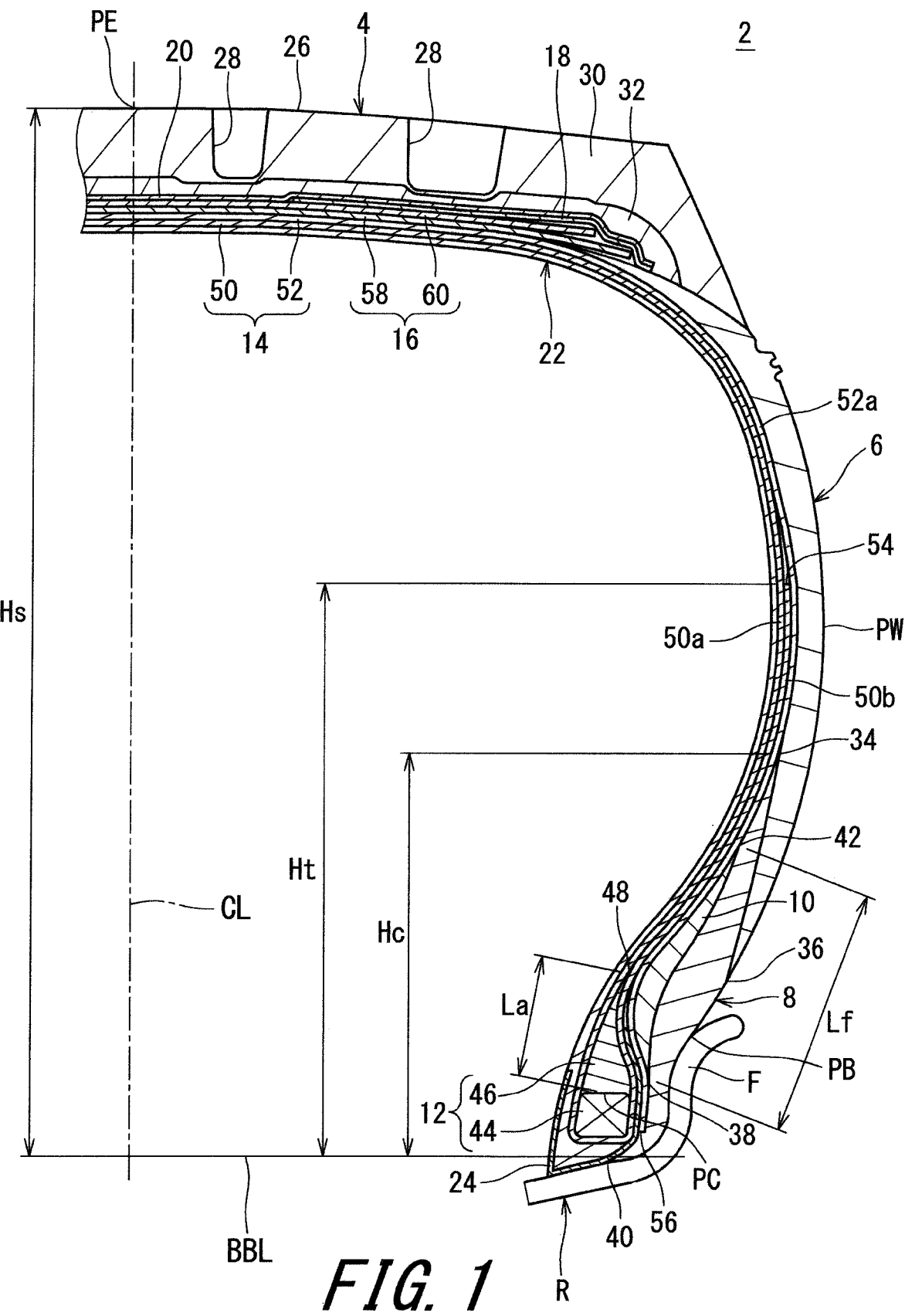
FIG. 1 is a cross-sectional view of a part of a pneumatic tire according to one embodiment of the present invention.

FIG. 1 shows a pneumatic tire 2. In FIG. 1, the up-down direction represents the radial direction of the tire 2, the left-right direction represents the axial direction of the tire 2, and the direction orthogonal to the surface of the drawing sheet represents the circumferential direction of the tire 2. In FIG. 1, an alternate long and short dash line CL represents the equator plane of the tire 2. The tire 2 has a shape that is symmetric with respect to the equator plane except for a tread pattern.

The tire 2 is mounted on a rim R. The rim R is a normal rim. The tire 2 is inflated with air. The internal pressure of the tire 2 is a normal internal pressure.

In the present invention, the dimensions and angles of components of the tire 2 are measured in a state where the tire 2 is mounted on a normal rim, and the tire 2 is inflated with air to a normal internal pressure, unless otherwise specified. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure. Dimensions and angles of components of a tire 102 and a tire 202 described below are also measured in the same state as that of the tire 2.

In FIG. 1, reference character PB represents a specific position on the outer surface of the tire 2. The position PB corresponds to an outer side edge, in the radial direction, of a contact surface on which the tire 2 and the rim R contact with each other. The contact surface is obtained when the tire 2 is mounted on the rim R and inflated with air to a normal internal pressure. In the present invention, the position PB is referred to as a separation point.

In FIG. 1, a solid line BBL represents a bead base line. The bead base line is a line that defines a rim diameter (see JATMA) of the rim R. The bead base line extends in the axial direction. A double-headed arrow Hs represents a height, in the radial direction, from the bead base line to an equator PE of the tire 2. The height Hs is a cross-sectional height of the tire 2.

In FIG. 1, reference character PW represents a specific position on the outer surface of the tire 2. The tire 2 has, at the positions PW, the maximum width in the axial direction on a profile of the outer surface. In the tire 2, the length, in the axial direction, between the right and the left side surfaces at the positions PW is represented as the maximum width (also referred to as cross-sectional width) of the tire 2. In the present invention, the position PW represents the maximum width position of the tire 2.

The tire 2 includes a tread 4, a pair of sidewalls 6, a pair of clinches 8, a pair of fillers 10, a pair of beads 12, a carcass 14, a belt 16, a pair of edge bands 18, a band 20, an inner liner 22, and a pair of chafers 24. The tire 2 is of a tubeless type. The tire 2 is mounted to a small truck. The tire 2 corresponds to a small truck tire defined in Chapter B in the JATMA standard.

The tread 4 has a shape that projects outward in the radial direction. The tread 4 forms a tread surface 26 that comes into contact with a road surface. The tread 4 has grooves 28 formed therein. A tread pattern is formed by the grooves 28. The tread 4 has a cap layer 30 and a base layer 32. The cap layer 30 is disposed outward of the base layer 32 in the radial direction. The cap layer 30 is layered over the base layer 32. The cap layer 30 is formed of crosslinked rubber excellent in wear resistance, heat resistance, and grip performance. The base layer 32 is formed of crosslinked rubber excellent in adhesiveness. A typical base rubber of the base layer 32 is natural rubber.

The sidewalls 6 extend almost inward from ends, respectively, of the tread 4 in the radial direction. The outer side portions, in the radial direction, of the sidewalls 6 are jointed to the tread 4. The inner side portions, in the radial direction, of the sidewalls 6 are jointed to the clinches 8. The sidewalls 6 are disposed outward of the carcass 14 in the axial direction. The sidewalls 6 are formed of crosslinked rubber excellent in cut resistance and weather resistance. The sidewalls 6 prevent damage to the carcass 14.

The clinches 8 are disposed inward of the sidewalls 6, respectively, in the radial direction. The clinches 8 are disposed outward of the beads 12, the carcass 14, and the fillers 10 in the axial direction. The clinches 8 are tapered outward in the radial direction. The clinches 8 are tapered inward in radial direction. The clinches 8 are formed of crosslinked rubber excellent in wear resistance. The clinch 8 comes into contact with a flange F of the rim R.

In the tire 2, an outer end 34 of the clinch 8 is disposed outward of an inner end 36 of the sidewall 6 in the radial direction. The outer end 34 of the clinch 8 is covered with the sidewall 6, which is shown in the drawings. The inner end 36 of the sidewall 6 is disposed on the side surface of the tire 2.

In the tire 2, a complex elastic modulus $E^*c$ of the clinch 8 is preferably higher than or equal to 10 MPa and preferably not higher than 90 MPa. When the complex elastic modulus $E^*c$ is set to be higher than or equal to 10 MPa, the clinches 8 contribute to stiffness. In the tire 2, flexure is effectively reduced. Reduction of flexure inhibits concentration of strain and heat generation. The tire 2 is excellent in durability. When the complex elastic modulus $E^*c$ is set to be not higher than 90 MPa, influence of the clinches 8 on stiffness is reduced. The tire 2 is excellent in ride comfort.

In the present invention, the complex elastic modulus $E^*c$ of the clinch 8 is measured in compliance with the standard of "JIS K 6394" by using the viscoelasticity spectrometer (trade name "VESF-3" manufactured by Iwamoto Seisakusho) under the following measurement conditions. In this measurement, a plate-shaped test piece (length=45 mm, width=4 mm, thickness=2 mm) is formed from a rubber composition of the clinch 8. The test piece is used in the measurement. A complex elastic modulus $E^*a$ of an apex described below, and a complex elastic modulus $E^*f$ of the filler 10 described below are obtained in the same manner.

Initial strain: 10%
Amplitude: ±2.0%
Frequency: 10 Hz
Deformation mode: tension
Measurement temperature: 70° C.

The fillers 10 are disposed inward of the clinches 8, respectively, in the axial direction. The fillers 10 are tapered outward in the radial direction. The fillers 10 are tapered inward in the radial direction.

In the tire 2, an inner end 38 of the filler 10 is disposed outward of an inner end 40 of the clinch 8 in the radial direction. The inner end 38 of the filler 10 is covered with the clinch 8. An outer end 42 of the filler 10 is disposed inward of the outer end 34 of the clinch 8 in the radial direction. The outer end 42 of the filler 10 is covered with the clinch 8. The outer end 42 of the filler 10 may be disposed outward of the outer end 34 of the clinch 8. In this case, the outer end 42 of the filler 10 is covered with the sidewall 6.

In the tire 2, the inner end 38 of the filler 10 is preferably disposed inward of the separation point PB in the radial direction. In other words, a part of the filler 10 is preferably disposed inward of the separation point PB in the radial direction. Thus, a part of the filler 10 is disposed between the bead 12 and the flange F, whereby the filler 10 acts against deformation of the bead 12 portion. The fillers 10 contribute to pliable flexure of the bead 12 portions. Concentration of strain and heat generation are inhibited, and the tire 2 is thus excellent in durability.

In the tire 2, a complex elastic modulus $E^*f$ of the filler 10 is preferably higher than or equal to 15 MPa and preferably not higher than 75 MPa. When the complex elastic modulus $E^*f$ is set to be higher than or equal to 15 MPa, the fillers 10 contribute to stiffness. In the tire 2, flexure is effectively reduced. Reduction of flexure inhibits concentration of strain and heat generation. The tire 2 is excellent in durability. When the complex elastic modulus $E^*f$ is set to be not higher than 75 MPa, influence of the fillers 10 on stiffness is reduced. The tire 2 is excellent in ride comfort.

The fillers 10 are formed by a rubber composition being crosslinked. In other words, the fillers 10 are formed of crosslinked rubber. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more kinds of rubbers may be used in combination.

The rubber composition of the fillers 10 contains a reinforcing agent. The reinforcing agent is typically carbon black. Carbon black such as FEF, GPF, HAF, ISAF, SAF, and the like can be used. From the viewpoint of inhibiting heat generation due to deformation, silica may be used in addition to or instead of the carbon black. In this case, dry silica and wet silica can be used. From the viewpoint of strength of the fillers 10, an amount of the reinforcing agent with respect to 100 parts by weight of the base rubber is preferably greater than or equal to 5 parts by weight. From the viewpoint of flexibility of the fillers 10, an amount of the reinforcing agent is preferably not greater than 50 parts by weight.

To the rubber composition of the fillers 10, a crosslinking agent, a softener, stearic acid, zinc oxide, an antioxidant, a wax, a crosslinking activator, and the like are added as appropriate.

The beads 12 are disposed inward of the fillers 10, respectively, in the radial direction. The beads 12 are disposed inward of the fillers 10 and the clinches 8, respectively, in the axial direction. Each bead 12 includes a core 44 and an apex 46. The core 44 is ring-shaped. The core 44 includes a wound non-stretchable wire. A typical material of the wire is steel. The apex 46 extends outward from the core 44 in the radial direction. The apex 46 is tapered outward in the radial direction. An end 48 of the apex 46 is disposed outward of the inner end 38 of the filler 10 in the radial direction. The end 48 of the apex 46 is disposed inward of the outer end 42 of the filler 10 in the radial direction.

The apex 46 is formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more kinds of rubbers may be used in combination.

The rubber composition of the apex 46 contains a reinforcing agent. The reinforcing agent is typically carbon black. Carbon black such as FEF, GPF, HAF, ISAF, SAF, and the like can be used. From the viewpoint of inhibiting heat generation due to deformation, silica may be used in addition to or instead of the carbon black. In this case, dry silica and wet silica can be used. From the viewpoint of strength of the apex 46, an amount of the reinforcing agent with respect to 100 parts by weight of the base rubber is preferably greater than or equal to 5 parts by weight. From the viewpoint of flexibility of the apex 46, an amount of the reinforcing agent is preferably not greater than 50 parts by weight.

To the rubber composition of the apex 46, a crosslinking agent, a softener, stearic acid, zinc oxide, an antioxidant, a wax, a crosslinking activator, and the like are added as appropriate.

In the tire 2, a complex elastic modulus $E^*a$ of the apex 46 is preferably higher than or equal to 20 MPa and preferably not higher than 60 MPa. When the complex elastic modulus $E^*a$ is set to be higher than or equal to 20 MPa, the apexes 46 contribute to stiffness. In the tire 2, flexure is effectively reduced. Reduction of flexure inhibits concentration of strain and heat generation. The tire 2 is excellent in durability. When the complex elastic modulus $E^*a$ is set to be not higher than 60 MPa, influence of the apexes 46 on stiffness is reduced. The tire 2 is excellent in ride comfort.

As described above, in the tire 2, the fillers 10 are formed by a rubber composition being crosslinked. Narrowing of kinds of rubber compositions used for the tire 2 contributes to cost of the tire 2. In this viewpoint, the fillers 10 may be formed by crosslinking of the same rubber composition as that of the apexes 46. In other words, the material of the fillers 10 may be the same as the material of the apexes 46.

The carcass 14 includes a first carcass ply 50 and a second carcass ply 52. The first carcass ply 50 and the second carcass ply 52 are each extended on and between the beads 12 on both sides. The first carcass ply 50 and the second carcass ply 52 extend along the tread 4 and the sidewalls 6. The first carcass ply 50 and the second carcass ply 52 are each formed of multiple cords aligned with each other, and topping rubber. An absolute value of an angle of each cord relative to the equator plane is from 75° to 90°. In other words, the carcass 14 forms a radial structure. The cords are formed of an organic fiber. Preferable examples of the organic fiber include polyester fibers, nylon fibers, rayon fibers, polyethylene naphthalate fibers, aramid fibers, and polyketone fibers.

In the tire 2, the first carcass ply 50 is turned up around the cores 44 from the inner side toward the outer side in the axial direction. By the turning-up, the first carcass ply 50 includes a first main portion 50a and first turned-up portions 50b. The second carcass ply 52 is disposed outward of the first carcass ply 50. The second carcass ply 52 covers ends 54 of the first turned-up portions 50b. Ends 56 of the second carcass ply 52 are disposed outward of the beads 12 in the axial direction. In the tire 2, the second carcass ply 52 is not turned up around the cores 44. Therefore, the second carcass ply 52 has no turned-up portions. The second carcass ply 52 merely has a main portion (hereinafter, referred to as a second main portion 52a). In the tire 2, the second carcass ply 52 may be turned up around the cores 44 from the inner side toward the outer side in the axial direction. The carcass 14 may be formed from one carcass ply, that is, may be formed merely from the first carcass ply 50.

As is apparent from FIG. 1, the ends 54 of the first turned-up portions 50b are each disposed near the maximum width position PW. In the tire 2, the carcass 14 has a "highly turned-up (HTU)" structure. In the tire 2, the carcass 14 may be formed such that the ends 54 of the first turned-up portions 50b are disposed near the beads 12. In this case, the structure of the carcass 14 is referred to as a "low turn-up (LTU)" structure. In the carcass 14, in a case where two carcass plies are turned up, and each of the carcass plies has turned-up portions, whether the carcass has an "HTU" structure or an "LTU" structure is determined on the basis of the turned-up portion having outermost end in the radial direction.

In FIG. 1, a double-headed arrow Ht represents a height, in the radial direction, from the bead base line to the end 54 of the first turned-up portion 50b.

In the tire 2, a ratio of the height Ht to the cross-sectional height Hs is preferably greater than or equal to 0.45 and preferably not greater than 0.55. When the ratio is set to be greater than or equal to 0.45, force in a compressing direction is prevented from acting in the end 54 of the first turned-up portion 50b. In the tire 2, strain is less likely to concentrate on the end 54 of the first turned-up portion 50b. The tire 2 is excellent in durability. Also when the ratio is set to be not greater than 0.55, force in a compressing direction is prevented from acting in the end 54 of the first turned-up portion 50b. In the tire 2, strain is less likely to concentrate on the end 54 of the first turned-up portion 50b. The tire 2 is excellent in durability.

In the tire 2, in a case where the carcass 14 has the "LTU" structure, the height Ht is preferably less than or equal to 28 mm. Thus, force in a compressing direction is prevented from acting in the end 54 of the first turned-up portion 50b. In the tire 2, strain is less likely to concentrate on the end 54 of the first turned-up portion 50b. The tire 2 is excellent in durability. From the viewpoint that the first turned-up portion 50b is prevented from being drawn off and the carcass 14 is sufficiently tensioned, the height Ht is preferably not less than 5 mm.

The belt 16 is disposed inward of the tread 4 in the radial direction. The belt 16 and the carcass 14 are layered over each other. The belt 16 reinforces the carcass 14. The belt 16 includes an inner layer 58 and an outer layer 60. As is apparent from FIG. 1, the width of the inner layer 58 is slightly greater than the width of the outer layer 60 in the axial direction. The inner layer 58 and the outer layer 60 are each formed of multiple cords aligned with each other, and topping rubber, which is not shown. Each cord is tilted relative to the equator plane. An absolute value of the tilt angle is greater than or equal to 10° and not greater than 35° in general. A direction in which the cords of the inner layer 58 are tilted relative to the equator plane is opposite to a direction in which the cords of the outer layer 60 are tilted relative to the equator plane. A material of the cords is preferably steel. An organic fiber may be used for the cords. The width, in the axial direction, of the belt 16 is preferably greater than or equal to 0.7 times the maximum width of the tire 2. The belt 16 may include three or more layers.

The edge bands 18 are disposed outward of the belt 16 in the radial direction, near the ends, respectively, of the belt 16. The edge bands 18 are disposed between the belt 16 and the band 20. The edge bands 18 may be disposed outward of the band 20 in the radial direction. The edge bands 18 are each formed of a cord and topping rubber, which are not shown. The cord is helically wound. Each edge band 18 has a so-called jointless structure. The cord extends substantially in the circumferential direction. An angle of the cord relative to the circumferential direction is less than or equal to 5° and more preferably less than or equal to 2°. The end portions of the belt 16 are held by the cords, whereby lifting of the belt 16 is inhibited. The cord is formed of an organic fiber. Preferable examples of the organic fiber include nylon fibers, polyester fibers, rayon fibers, polyethylene naphthalate fibers, and aramid fibers.

The band 20 is disposed outward of the belt 16 in the radial direction. The width of the band 20 is greater than the width of the belt 16 in the axial direction. The band 20 is formed of a cord and topping rubber, which are not shown. The cord is helically wound. The band 20 has a so-called jointless structure. The cord extends substantially in the circumferential direction. An angle of the cord relative to the circumferential direction is less than or equal to 5° and more preferably less than or equal to 2°. The belt 16 is held by the cord, whereby lifting of the belt 16 is inhibited. The cord is formed of an organic fiber. Preferable examples of the organic fiber include nylon fibers, polyester fibers, rayon fibers, polyethylene naphthalate fibers, and aramid fibers.

The inner liner 22 is disposed inward of the carcass 14. The inner liner 22 is joined to the inner surface of the carcass 14. The inner liner 22 is formed of crosslinked rubber excellent in air-tightness. A typical base rubber of the inner liner 22 is isobutylene-isoprene-rubber or halogenated isobutylene-isoprene-rubber. The inner liner 22 maintains internal pressure of the tire 2.

The chafers 24 are disposed near the beads 12, respectively. The chafers 24 come into contact with the rim R. By the contact, portions near the beads 12 are protected. In the present embodiment, the chafers 24 are formed of a fabric and rubber impregnated into the fabric. The chafers 24 may be integrated with the clinches 8. In this case, a material of the chafers 24 is the same as the material of the clinches 8.

Figure 2:
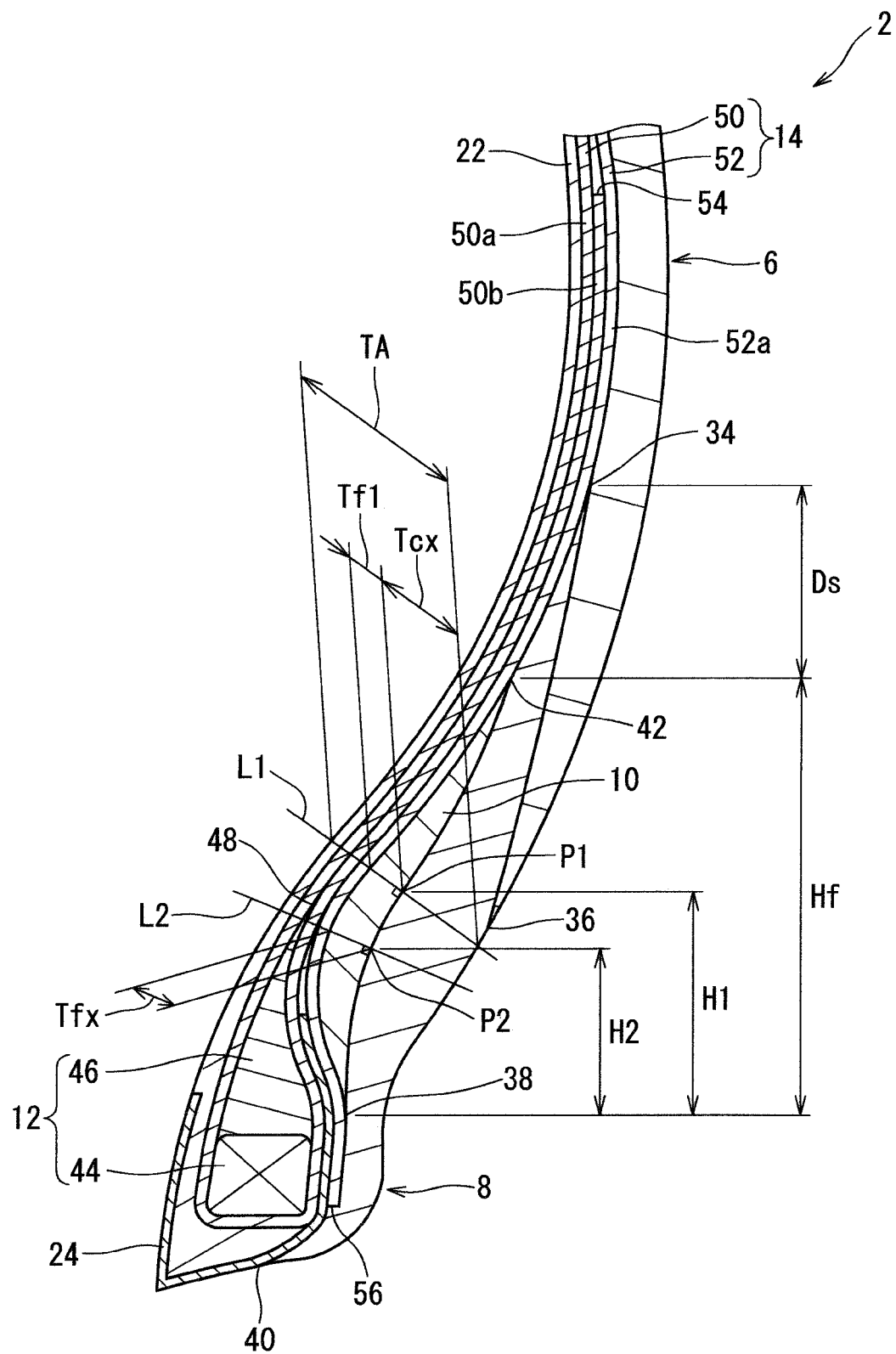
FIG. 2 is an enlarged cross-sectional view of a part of the tire shown in FIG. 1.

FIG. 2 shows the bead 12 portion of the tire 2 shown in FIG. 1. In FIG. 2, the up-down direction represents the radial direction of the tire 2, the left-right direction represents the axial direction of the tire 2, and the direction orthogonal to the surface of the drawing sheet represents the circumferential direction of the tire 2.

As shown in FIG. 2, the first turned-up portions 50b and the second main portion 52a are disposed between the fillers 10 and the apexes 46. The fillers 10 are layered over the clinches 8 in portions outward of the carcass 14 in the axial direction.

In the tire 2, the fillers 10 are disposed between the carcass 14 and the clinches 8, whereby the first turned-up portions 50b and the second main portion 52a are disposed at positions near the inner surface of the tire 2. In the tire 2, force in a compressing direction is prevented from acting in the first turned-up portions 50b and the second main portion 52a. In the tire 2, the carcass 14 is less likely to be damaged. Further, in the tire 2, the carcass 14 is sufficiently tensioned. The carcass 14 contributes to stiffness. Therefore, even if the tire 2 is under a load equivalent to a load index, flexure in the bead 12 portion is reduced. Reduction of flexure inhibits concentration of strain and heat generation. In the tire 2, the bead 12 portions are less likely to be damaged. The tire 2 is excellent in durability.

In the tire 2, the size of the apex 46 of each bead 12 is smaller than the size of a conventional apex. The small apex 46 allows the first turned-up portion 50b and the second main portion 52a to be disposed closer to the inner surface of the tire 2. In the tire 2, force in a compressing direction is effectively prevented from acting in the first turned-up portion 50b and the second main portion 52a. In the tire 2, the carcass 14 is less likely to be damaged. Further, in the tire 2, the carcass 14 is more sufficiently tensioned. The carcass 14 contributes to stiffness. Therefore, even if the tire 2 is under a load equivalent to a load index, flexure in the bead 12 portion is reduced. Reduction of flexure inhibits concentration of strain and heat generation. In the tire 2, the bead 12 portions are less likely to be damaged. The tire 2 is excellent in durability.

In the tire 2, a percentage of the complex elastic modulus $E^*f$ of the filler 10 relative to the complex elastic modulus $E^*a$ of the apex 46 is appropriately adjusted. More specifically, the percentage of the complex elastic modulus $E^*f$ of the filler 10 relative to the complex elastic modulus $E^*a$ of the apex 46 is greater than or equal to 70% and not greater than 125%. When the percentage is set to be greater than or equal to 70%, the fillers 10 are not excessively flexible as compared to the apexes 46 in the tire 2. The fillers 10 contribute to stiffness. In the tire 2, even if the tire 2 is under a load equivalent to a load index, flexure in the bead 12 portion is reduced. Reduction of flexure inhibits concentration of strain and heat generation. In the tire 2, the bead 12 portions are less likely to be damaged. The tire 2 is excellent in durability. In this viewpoint, the percentage is preferably greater than or equal to 90% and more preferably greater than or equal to 100%. Meanwhile, when the percentage is set to be not greater than 125%, the fillers 10 are not excessively hard as compared to the apexes 46 in the tire 2. A difference between stiffness of the apex 46 and stiffness of the filler 10 is reduced, whereby strain is less likely to concentrate on the first turned-up portion 50b and the second main portion 52a. In the tire 2, the bead 12 portions are less likely to be damaged. The tire 2 is excellent in durability. In this viewpoint, the percentage is preferably not greater than 110%.

In the tire 2, the thickness of the clinch 8 and the thickness of the filler 10 are measured along the line normal to the inner surface, in the axial direction, of the clinch 8. In FIG.

2, a double-headed arrow Tcx represents the maximum thickness of the clinch 8. That is, the clinch 8 has the maximum thickness Tcx. In FIG. 2, the normal line for the thickness Tcx is represented as a straight line L1. In the present invention, the normal line L1 is referred to as a first reference line. A double-headed arrow Tf1 represents the thickness, of the filler 10, which is measured along the first reference line L1. Further, in FIG. 2, a double-headed arrow Tfx represents the maximum thickness of the filler 10. That is, the filler 10 has the maximum thickness Tfx. In FIG. 2, the normal line for thickness Tfx is represented as a straight line L2. In the present invention, the normal line L2 is referred to as a second reference line.

In the tire 2, a ratio of the thickness Tf1 to a sum (Tf1+Tcx) of the thickness Tf1 and the thickness Tcx is greater than or equal to 0.1 and not greater than 0.6. When the ratio is set to be greater than or equal to 0.1, the fillers 10 contribute to stiffness. In the tire 2, flexure is effectively reduced. Even if the tire 2 is under a load equivalent to a load index, flexure in the bead 12 portion is reduced. Reduction of flexure inhibits concentration of strain and heat generation. In this viewpoint, the ratio is preferably greater than or equal to 0.14 and more preferably greater than or equal to 0.20. When the ratio is set to be not greater than 0.6, stiffness is appropriately maintained in the bead 12 portions. In the tire 2, flexure is appropriate in the bead 12 portions. Therefore, a position at which strain occurs due to the flexure is not specific. In the tire 2, strain is less likely to concentrate on the first turned-up portion 50b and the second main portion 52a. In the tire 2, the carcass 14 is less likely to be damaged. In this viewpoint, the ratio is preferably not greater than 0.50. Thus, the thickness of the filler 10 is controlled, whereby a degree of flexure in the bead 12 portion and a position at which strain occurs due to the flexure are adjusted. In the tire 2, the bead 12 portions are less likely to be damaged. The tire 2 is excellent in durability.

Thus, in the tire 2, the bead 12 portions are effectively prevented from being damaged. The tire 2 is excellent in durability. Further, in the tire 2, increase of volumes of the clinches 8, the apexes 46, and the like, or addition of new components, for improving durability, need not be performed. In the present invention, the pneumatic tire 2 that has improved durability can be obtained without increasing the weight and cost.

In FIG. 2, reference character P1 represents a point of intersection of the first reference line L1 and the inner surface, in the axial direction, of the clinch 8. A double-headed arrow H1 represents a height, in the radial direction, from the inner end 38 of the filler 10 to the point P1 of intersection. Reference character P2 represents a point of intersection of the second reference line L2 and the inner surface, in the axial direction, of the clinch 8. A double-headed arrow H2 represents a height, in the radial direction, from the inner end 38 of the filler 10 to the point P2 of intersection. A double-headed arrow Hf represents a height, in the radial direction, from the inner end 38 of the filler 10 to the outer end 42 thereof. The height Hf represents a height, in the radial direction, of the filler 10.

In the tire 2, a ratio of the height H2 to the height H1 is preferably greater than or equal to 0.6 and preferably not greater than 1.2. When the ratio is set to be greater than or equal to 0.6, a degree of curve, of the first turned-up portion 50b and the second main portion 52a, between the second reference line L2 and the core 44, is appropriately maintained. In the tire 2, the carcass 14 is sufficiently tensioned. The carcass 14 contributes to stiffness. Therefore, even if the tire 2 is under a load equivalent to a load index, flexure in the bead 12 portion is reduced. Reduction of flexure inhibits concentration of strain and heat generation. In the tire 2, the bead 12 portions are less likely to be damaged. The tire 2 is excellent in durability. In this viewpoint, the ratio is more preferably greater than or equal to 0.70. When the ratio is set to be not greater than 1.2, an outline (also referred to as a carcass line) of the carcass 14 in a zone from the maximum width position PW to the end 48 of the apex 46 is represented as an arc having an appropriate radius of curvature. In the tire 2, also in the sidewall 6 portions, strain is less likely to concentrate on the carcass 14. In the tire 2, the carcass 14 is less likely to be damaged. The tire 2 is excellent in durability. In this viewpoint, the ratio is more preferably not greater than 1.1.

In the tire 2, a ratio of the height H2 to the height Hf is preferably greater than or equal to 0.25 and preferably not greater than 0.5. When the ratio is set to be greater than or equal to 0.25, a degree of curve, of the first turned-up portion 50b and the second main portion 52a, between the second reference line L2 and the core 44 is appropriately maintained. In the tire 2, the carcass 14 is sufficiently tensioned. The carcass 14 contributes to stiffness. Therefore, even if the tire 2 is under a load equivalent to a load index, flexure in the bead 12 portion is reduced. Reduction of flexure inhibits concentration of strain and heat generation. In the tire 2, the bead 12 portions are less likely to be damaged. The tire 2 is excellent in durability. When the ratio is set to be not greater than 0.5, the carcass line in the zone from the maximum width position PW to the end 48 of the apex 46 is represented as an arc having an appropriate radius of curvature. In the tire 2, also in the sidewall 6 portions, strain is less likely to concentrate on the carcass 14. In the tire 2, the carcass 14 is less likely to be damaged. The tire 2 is excellent in durability.

In the tire 2, at a position (hereinafter, referred to as a position at the thickness Tcx) at which the clinch 8 has the maximum thickness Tcx, the filler 10 has the thickness Tf1, and the filler 10 contributes to pliable flexure of the bead 12 portion. Near the position at the thickness Tcx, the filler 10 has the maximum thickness Tfx, whereby the carcass 14 is sufficiently tensioned, and the outline of the carcass 14 contributes to pliable flexure of the entirety of the tire 2 as well as that of the bead 12 portions. In the tire 2, concentration of strain is less likely to occur. Even if the tire 2 is under a load equivalent to a load index, damage is less likely to occur in the tire 2. The tire 2 is excellent in durability.

In FIG. 2, a double-headed arrow TA represents the thickness of the tire 2. The thickness TA is measured along the first reference line L1. The thickness TA represents the thickness of the tire 2 at the position at the thickness Tcx.

In the tire 2, the thickness TA is preferably greater than or equal to 10 mm and preferably not greater than 20 mm. When the thickness TA is set to be greater than or equal to 10 mm, the bead 12 portion has appropriate stiffness. Even if the tire 2 is under a load equivalent to a load index, flexure in the bead 12 portion is reduced. Reduction of flexure inhibits concentration of strain and heat generation. In the tire 2, the bead 12 portions are less likely to be damaged. The tire 2 is excellent in durability. In this viewpoint, the thickness TA is more preferably greater than or equal to 12 mm. When the thickness TA is set to be not greater than 20 mm, influence of the thickness TA on the weight and cost is reduced. Further, stiffness of the bead 12 portions is appropriately maintained. Therefore, the tire 2 is excellent in ride comfort. In this viewpoint, the thickness TA is more preferably not greater than 18 mm.

In the tire 2, the outer end 42 of the filler 10 is preferably disposed inward or outward of the outer end 34 of the clinch 8 in the radial direction. In other words, the outer end 42 of the filler 10 is preferably unequal to the outer end 34 of the clinch 8 in the radial direction. Thus, strain due to flexure is dispersed so as to occur at the outer end 42 of the filler 10 and the outer end 34 of the clinch 8, which are disposed at different positions, respectively. Dispersion of strain contributes to improvement of durability of the tire 2. In FIG. 2, a double-headed arrow Ds represents a distance, in the radial direction, from the outer end 34 of the clinch 8 to the outer end 42 of the filler 10. From the viewpoint of durability, the distance Ds is preferably greater than or equal to 5 mm in both a case where the outer end 42 of the filler 10 is disposed inward of the outer end 34 of the clinch 8 in the radial direction and a case where the outer end 42 of the filler 10 is disposed outward of the outer end 34 of the clinch 8 in the radial direction. From the viewpoint of dispersion of strain, the outer end 42 of the filler 10 is preferably distant from the outer end 34 of the clinch 8. Therefore, the upper limit of the distance Ds is not defined.

As described above, the clinch 8 comes into contact with the flange F of the rim R. The clinches 8 are required to have wear resistance in order to prevent volume from being reduced due to rubbing against the flange F. The fillers 10 are layered over the clinches 8. Therefore, from the viewpoint of concentration of strain, balance between stiffness of the clinch 8 and stiffness of the filler 10 is also important. From the viewpoint of balance in wear resistance and stiffness, a percentage of the complex elastic modulus E*c of the clinch 8 relative to the complex elastic modulus E*f of the filler 10 is preferably greater than or equal to 70% and preferably not greater than 125%.

In FIG. 1, a double-headed arrow Hc represents a height, in the radial direction, from the bead base line to the outer end 34 of the clinch 8. The height Hc represents the height of the clinch 8. A double-headed arrow La represents the length of the apex 46. The length La is represented as the length from the center (reference character PC in FIG. 1), in the axial direction, of the bottom surface of the apex 46 to the end 48 thereof. A double-headed arrow Lf represents the length of the filler 10. The length Lf is represented as a length of a line segment that connects between the inner end 38 of the filler 10 and the outer end 42 thereof.

In the tire 2, the height Hc of the clinch 8 is preferably greater than or equal to 30 mm and preferably not greater than 60 mm. When the height Hc is set to be greater than or equal to 30 mm, the sidewall 6 that is more flexible than the clinch 8 is prevented from contacting with the flange F. In the tire 2, damage (also referred to as rim chafing) in which volume of the bead 12 portion is reduced due to rubbing against the flange F, is prevented. When the height Hc is set to be not greater than 60 mm, stiffness in a portion inward of the maximum width position PW is appropriately maintained. Pliable flexure occurs in the entirety of the tire 2. Further, in the tire 2, strain is less likely to concentrate on the outer end 34 of the clinch 8 and the end 54 of the first turned-up portion 50b. The tire 2 is excellent in durability.

In the tire 2, the length La of the apex 46 is preferably less than or equal to 10 mm. When the length is set to be less than or equal to 10 mm, strain is prevented from concentrating on the end 48 of the apex 46. The tire 2 is excellent in durability. The length La is preferably not less than 5 mm. Thus, a degree of curve, of the first turned-up portion 50b and the second main portion 52a, between the second reference line L2 and the core 44 is appropriately maintained, and influence on durability is reduced.

In the tire 2, the length Lf of the filler 10 is preferably greater than or equal to 10 mm and preferably not greater than 50 mm. When the length Lf is set to be greater than or equal to 10 mm, the fillers 10 contribute to stiffness. In the tire 2, even if the tire 2 is under a load equivalent to a load index, flexure in the bead 12 portion is reduced. Reduction of flexure inhibits concentration of strain and heat generation. In the tire 2, the bead 12 portions are less likely to be damaged. The tire 2 is excellent in durability. When the length Lf is set to be not greater than 50 mm, stiffness is appropriately maintained in a portion inward of the maximum width position PW. Pliable flexure occurs in the entirety of the tire 2. Further, in the tire 2, strain is less likely to concentrate on the outer end 42 of the filler 10 and the end 54 of the first turned-up portion 50b. The tire 2 is excellent in durability.

In the tire 2, low heat generating rubber may be used for the fillers 10. Thus, heat generation in the bead 12 portions is further inhibited. In the tire 2, damage to the bead 12 portions is further inhibited. The tire 2 is excellent in durability. In this viewpoint, a loss tangent (tans) of the filler 10 is preferably less than or equal to 0.15 and more preferably less than or equal to 0.10. From the viewpoint of stiffness of the fillers 10, the loss tangent is preferably not less than 0.04. The loss tangent of the filler 10 is obtained simultaneously when the complex elastic modulus E*f of the filler 10 described above is measured.

Second Embodiment

Figure 3:
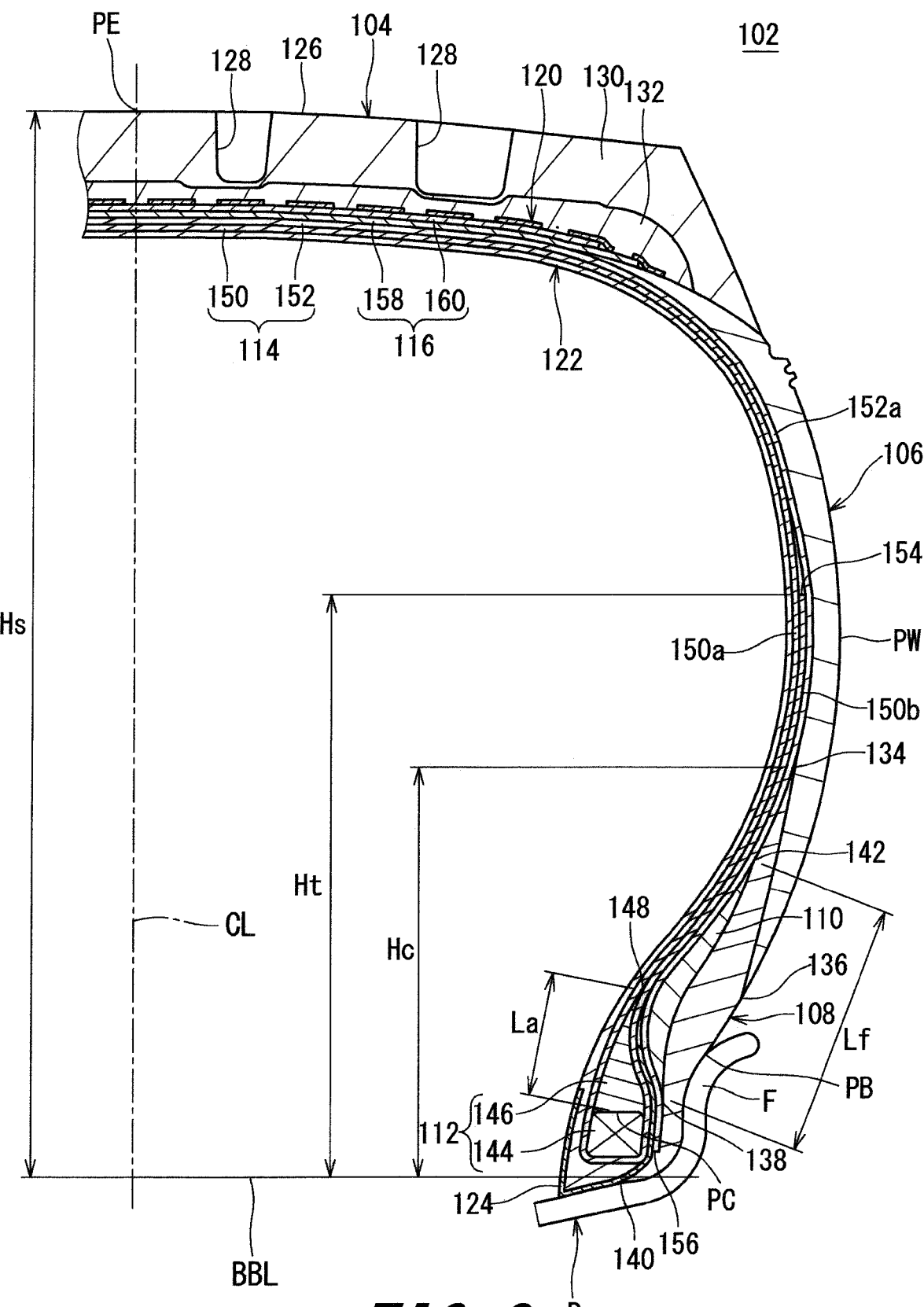
FIG. 3 is a cross-sectional view of a part of a pneumatic tire according to another embodiment of the present invention.

FIG. 3 shows a pneumatic tire 102. In FIG. 3, the up-down direction represents the radial direction of the tire 102, the left-right direction represents the axial direction of the tire 102, and the direction orthogonal to the surface of the drawing sheet represents the circumferential direction of the tire 102. In FIG. 3, an alternate long and short dash line CL represents the equator plane of the tire 102. The tire 102 has a shape that is symmetric with respect to the equator plane except for a tread pattern.

The tire 102 is mounted on a rim R. The rim R is a normal rim. The tire 102 is inflated with air. The internal pressure of the tire 102 is a normal internal pressure.

In FIG. 3, reference character PB represents a specific position on the outer surface of the tire 102. The position PB corresponds to an outer side edge, in the radial direction, of a contact surface on which the tire 102 and the rim R contact with each other. The position PB is a separation point.

In FIG. 3, a solid line BBL represents a bead base line. A double-headed arrow Hs represents a height, in the radial direction, from the bead base line to an equator PE of the tire 102. The height Hs is a cross-sectional height of the tire 102.

In FIG. 3, reference character PW represents a specific position on the outer surface of the tire 102. The tire 102 has, at the positions PW, the maximum width in the axial direction on a profile of the outer surface. The position PW represents the maximum width position of the tire 102.

The tire 102 includes a tread 104, a pair of sidewalls 106, a pair of clinches 108, a pair of fillers 110, a pair of beads 112, a carcass 114, a belt 116, a band 120, an inner liner 122, and a pair of chafers 124. The tire 102 is of a tubeless type. The tire 102 is mounted to a small truck.

The tread 104 has a shape that projects outward in the radial direction. The tread 104 forms a tread surface 126 that comes into contact with a road surface. The tread 104 has grooves 128 formed therein. A tread pattern is formed by the grooves 128. The tread 104 has a cap layer 130 and a base layer 132. The cap layer 130 is disposed outward of the base layer 132 in the radial direction. The cap layer 130 is layered over the base layer 132. The cap layer 130 is formed of crosslinked rubber excellent in wear resistance, heat resistance, and grip performance. The base layer 132 is formed of crosslinked rubber excellent in adhesiveness. A typical base rubber of the base layer 132 is natural rubber.

The sidewalls 106 extend almost inward from ends, respectively, of the tread 104 in the radial direction. The outer side portions, in the radial direction, of the sidewalls 106 are jointed to the tread 104. The inner side portions, in the radial direction, of the sidewalls 106 are jointed to the clinches 108. The sidewalls 106 are disposed outward of the carcass 114 in the axial direction. The sidewalls 106 are formed of crosslinked rubber excellent in cut resistance and weather resistance. The sidewalls 106 prevent damage to the carcass 114.

The clinches 108 are disposed inward of the sidewalls 106, respectively, in the radial direction. The clinches 108 are disposed outward of the beads 112, the carcass 114, and the fillers 110 in the axial direction. The clinches 108 are tapered outward in the radial direction. The clinches 108 are tapered inward in radial direction. The clinches 108 are formed of crosslinked rubber excellent in wear resistance. The clinch 108 comes into contact with a flange F of the rim R.

In the tire 102, an outer end 134 of the clinch 108 is disposed outward of an inner end 136 of the sidewall 106 in the radial direction. The outer end 134 of the clinch 108 is covered with the sidewall 106, which is shown in the drawings. The inner end 136 of the sidewall 106 is disposed on the side surface of the tire 102.

The fillers 110 are disposed inward of the clinches 108, respectively, in the axial direction. The fillers 110 are layered over the clinches 108 in portions outward of the carcass 114 in the axial direction. The fillers 110 are tapered outward in the radial direction. The fillers 110 are tapered inward in the radial direction.

In the tire 102, an inner end 138 of the filler 110 is disposed outward of the inner end 140 of the clinch 108 in the radial direction. The inner end 138 of the filler 110 is covered with the clinch 108. An outer end 142 of the filler 110 is disposed inward of the outer end 134 of the clinch 108 in the radial direction. The outer end 142 of the filler 110 is covered with the clinch 108. The outer end 142 of the filler 110 may be disposed outward of the outer end 134 of the clinch 108. In this case, the outer end 142 of the filler 110 is covered with the sidewall 106.

In the tire 102, the inner end 138 of the filler 110 is preferably disposed inward of the separation point PB in the radial direction. In other words, a part of the filler 110 is preferably disposed inward of the separation point PB in the radial direction. Thus, a part of the filler 110 is disposed between the bead 112 and the flange F, whereby the filler 110 acts against deformation of the bead 112 portion. The fillers 110 contribute to pliable flexure of the bead 112 portions. Concentration of strain and heat generation are inhibited, and the tire 102 is thus excellent in durability.

The fillers 110 are formed by a rubber composition being crosslinked. In other words, the fillers 110 are formed of crosslinked rubber. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more kinds of rubbers may be used in combination.

The rubber composition of the fillers 110 contains a reinforcing agent. The reinforcing agent is typically carbon black. Carbon black such as FEF, GPF, HAF, ISAF, SAF, and the like can be used. From the viewpoint of inhibiting heat generation due to deformation, silica may be used in addition to or instead of the carbon black. In this case, dry silica and wet silica can be used. From the viewpoint of strength of the fillers 110, an amount of the reinforcing agent with respect to 100 parts by weight of the base rubber is preferably greater than or equal to 5 parts by weight. From the viewpoint of flexibility of the fillers 110, an amount of the reinforcing agent is preferably not greater than 50 parts by weight.

To the rubber composition of the fillers 110, a crosslinking agent, a softener, stearic acid, zinc oxide, an antioxidant, a wax, a crosslinking activator, and the like are added as appropriate.

The beads 112 are disposed inward of the fillers 110, respectively, in the radial direction. The beads 112 are disposed inward of the fillers 110 and the clinches 108, respectively, in the axial direction. Each bead 112 includes a core 144 and an apex 146. The core 144 is ring-shaped. The core 144 includes a wound non-stretchable wire. A typical material of the wire is steel. The apex 146 extends outward from the core 144 in the radial direction. The apex 146 is tapered outward in the radial direction. An end 148 of the apex 146 is disposed outward of the inner end 138 of the filler 110 in the radial direction. The end 148 of the apex 146 is disposed inward of the outer end 142 of the filler 110 in the radial direction.

The apex 146 is formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more kinds of rubbers may be used in combination.

The rubber composition of the apex 146 contains a reinforcing agent. The reinforcing agent is typically carbon black. Carbon black such as FEF, GPF, HAF, ISAF, SAF, and the like can be used. From the viewpoint of inhibiting heat generation due to deformation, silica may be used in addition to or instead of the carbon black. In this case, dry silica and wet silica can be used. From the viewpoint of strength of the apex 146, an amount of the reinforcing agent with respect to 100 parts by weight of the base rubber is preferably greater than or equal to 5 parts by weight. From the viewpoint of flexibility of the apex 146, an amount of the reinforcing agent is preferably not greater than 50 parts by weight.

To the rubber composition of the apex 146, a crosslinking agent, a softener, stearic acid, zinc oxide, an antioxidant, a wax, a crosslinking activator, and the like are added as appropriate.

As described above, in the tire 102, the fillers 110 are formed by a rubber composition being crosslinked. Narrowing of kinds of rubber compositions used for the tire 102 contributes to cost of the tire 102. In this viewpoint, the fillers 110 may be formed by crosslinking of the same rubber composition as that of the apexes 146. In other words, the material of the fillers 110 may be the same as the material of the apexes 146.

In the tire 102, a ratio between a complex elastic modulus $E^*a$ of the apex 146 and a complex elastic modulus $E^*f$ of the filler 110 is appropriately adjusted. Specifically, a ratio ($E^*f/E^*a$), in percentage, of the complex elastic modulus $E^*f$ of the filler 110 to the complex elastic modulus $E^*a$ of the apex 146 is greater than or equal to 70% and not greater than 125%.

In the present invention, the complex elastic modulus E*a of the apex 146, the complex elastic modulus E*f of the filler 110, and a complex elastic modulus E*c of the clinch 108 described below are measured in compliance with the standard of "JIS K 6394" by using the viscoelasticity spectrometer (trade name "VESF-3" manufactured by Iwamoto Seisakusho) under the following measurement conditions. In this measurement, a plate-shaped test piece (length=45 mm, width=4 mm, thickness=2 mm) is formed from a rubber composition of each of the apex 146, the filler 110, and the clinch 108. The test piece is used in the measurement.

Initial strain: 10%
Amplitude: ±2.0%
Frequency: 10 Hz
Deformation mode: tension
Measurement temperature: 70° C.

The carcass 114 includes a first carcass ply 150 and a second carcass ply 152. The first carcass ply 150 and the second carcass ply 152 are each extended on and between the beads 112 on both sides. The first carcass ply 150 and the second carcass ply 152 extend along the tread 104 and the sidewalls 106. The first carcass ply 150 and the second carcass ply 152 are each formed of multiple cords aligned with each other, and topping rubber. An absolute value of an angle of each cord relative to the equator plane is from 75° to 90°. In other words, the carcass 114 forms a radial structure. The cords are formed of an organic fiber. Preferable examples of the organic fiber include polyester fibers, nylon fibers, rayon fibers, polyethylene naphthalate fibers, aramid fibers, and polyketone fibers.

In the tire 102, the first carcass ply 150 is turned up around the cores 144 from the inner side toward the outer side in the axial direction. By the turning-up, the first carcass ply 150 includes a first main portion 150a and first turned-up portions 150b. The second carcass ply 152 is disposed outward of the first carcass ply 150. The second carcass ply 152 covers ends 154 of the first turned-up portions 150b. Ends 156 of the second carcass ply 152 are disposed outward of the beads 112 in the axial direction. In the tire 102, the second carcass ply 152 is not turned up around the cores 144. Therefore, the second carcass ply 152 has no turned-up portions. The second carcass ply 152 merely has a main portion 152a (hereinafter, referred to as a second main portion 152a). In the tire 102, the second carcass ply 152 may be turned up around the cores 144 from the inner side toward the outer side in the axial direction. The carcass 114 may be formed from one carcass ply, that is, may be formed merely from the first carcass ply 150.

As is apparent from FIG. 3, the ends 154 of the first turned-up portions 150b are each disposed near the maximum width position PW. In the tire 102, the carcass 114 has a "highly turned-up (HTU)" structure. In the tire 102, the carcass 114 may be formed such that the ends 154 of the first turned-up portions 150b are disposed near the beads 112.

In FIG. 3, a double-headed arrow Ht represents a height, in the radial direction, from the bead base line to the end 154 of the first turned-up portion 150b.

In the tire 102, a ratio of the height Ht to the cross-sectional height Hs is preferably greater than or equal to 0.45 and preferably not greater than 0.55. When the ratio is set to be greater than or equal to 0.45, force in a compressing direction is prevented from acting in the end 154 of the first turned-up portion 150b. In the tire 102, strain is less likely to concentrate on the end 154 of the first turned-up portion 150b. The tire 102 is excellent in durability. Also when the ratio is set to be not greater than 0.55, force in a compressing direction is prevented from acting in the end 154 of the first turned-up portion 150b. In the tire 102, strain is less likely to concentrate on the end 154 of the first turned-up portion 150b. The tire 102 is excellent in durability.

In the tire 102, in a case where the carcass 114 has the "LTU" structure, the height Ht is preferably less than or equal to 28 mm. Thus, force in a compressing direction is prevented from acting in the end 154 of the first turned-up portion 150b. In the tire 102, strain is less likely to concentrate on the end 154 of the first turned-up portion 150b. The tire 102 is excellent in durability. From the viewpoint that the first turned-up portion 150b is prevented from being drawn off and the carcass 114 is sufficiently tensioned, the height Ht is preferably not less than 5 mm.

Figure 4:
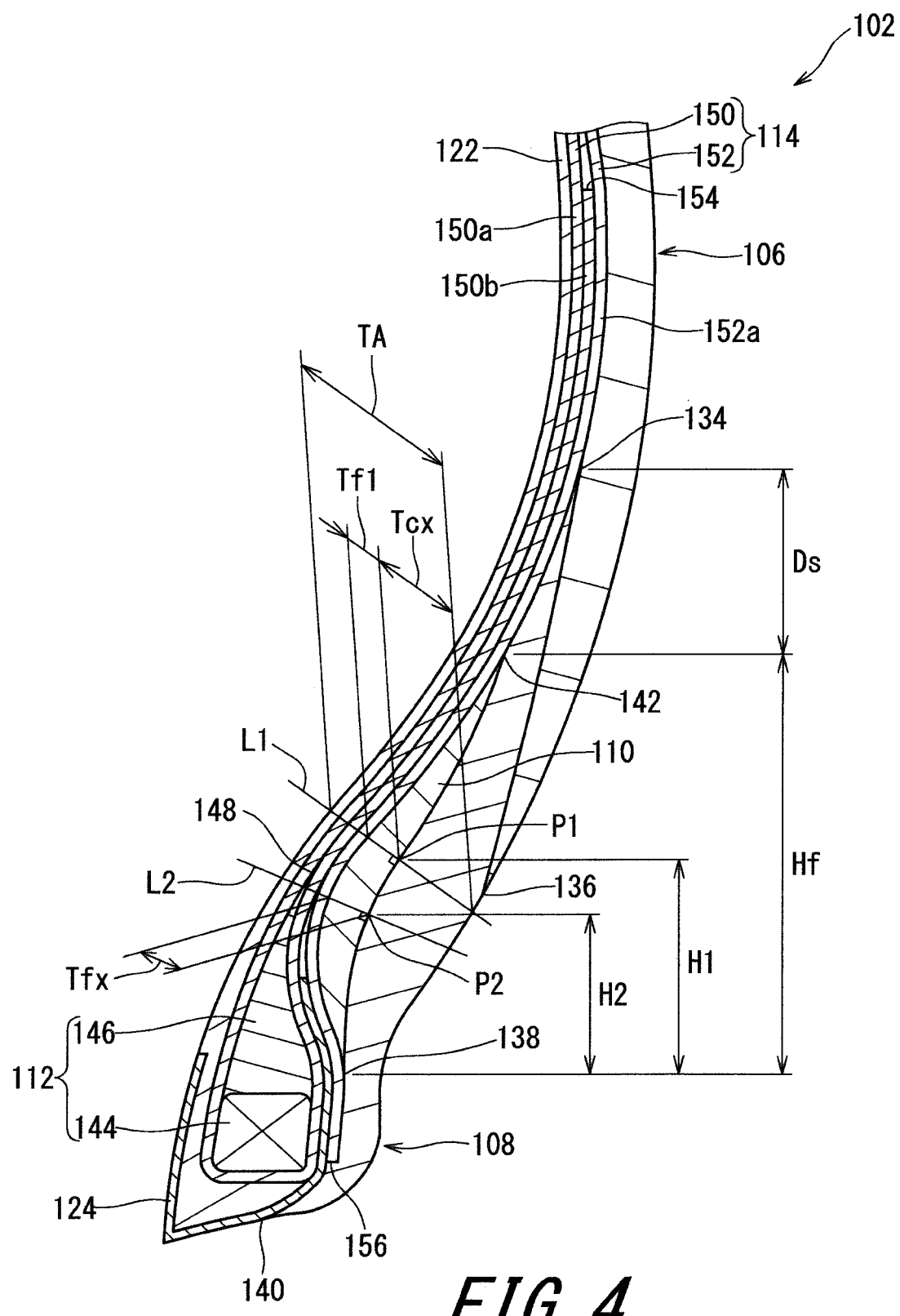
FIG. 4 is an enlarged cross-sectional view of a bead portion of the tire shown in FIG. 3.

FIG. 4 shows the bead 112 portion of the tire 102 shown in FIG. 3. In FIG. 4, the up-down direction represents the radial direction of the tire 102, the left-right direction represents the axial direction of the tire 102, and the direction orthogonal to the surface of the drawing sheet represents the circumferential direction of the tire 102. As shown in FIG. 4, the first turned-up portion 150b and the second main portion 152a are disposed between the filler 110 and the apex 146. The size of the apex 146 is smaller than the size of an apex of a conventional tire having no fillers. The first turned-up portion 150b and the second main portion 152a are curved inward in a portion inward of the filler 110 in the axial direction. In the tire 102, the first turned-up portion 150b and the second main portion 152a of the carcass 114 are disposed closer to the inner surface of the tire 102 than those of a conventional tire having no fillers are.

The belt 116 is disposed inward of the tread 104 in the radial direction. The belt 116 and the carcass 114 are layered over each other. The belt 116 reinforces the carcass 114. The belt 116 includes an inner layer 158 and an outer layer 160. As is apparent from FIG. 5, the width of the inner layer 158 is slightly greater than the width of the outer layer 160 in the axial direction. The inner layer 158 and the outer layer 160 are each formed of multiple cords aligned with each other, and topping rubber, which is not shown. Each cord is tilted relative to the equator plane. An absolute value of the tilt angle is greater than or equal to 10° and not greater than 35° in general. A direction in which the cords of the inner layer 158 are tilted relative to the equator plane is opposite to a direction in which the cords of the outer layer 160 are tilted relative to the equator plane. A material of the cords is preferably steel. An organic fiber may be used for the cords. The width, in the axial direction, of the belt 116 is preferably greater than or equal to 0.7 times the maximum width of the tire 102. The belt 116 may include three or more layers.

The band 120 is disposed outward of the belt 116 in the radial direction. The band 120 is disposed inward of the tread 104 in the radial direction. The band 120 is a full band.

Figure 5:
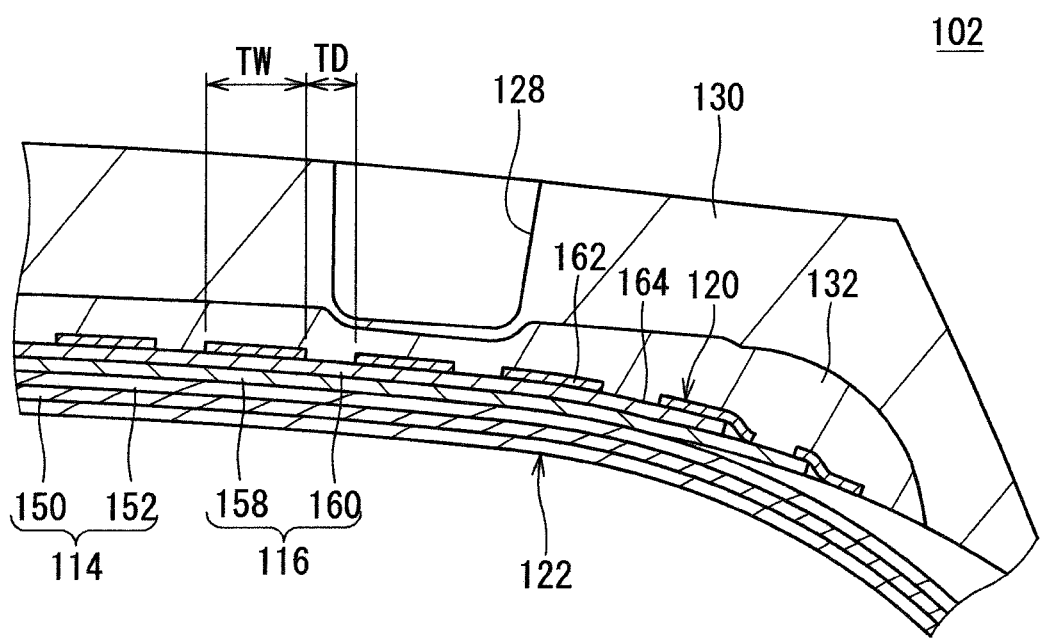
FIG. 5 is an enlarged cross-sectional view of a tread portion of the tire shown in FIG. 3.

FIG. 5 shows the tread 104 portion of the tire 102 shown in FIG. 3. In FIG. 5, the up-down direction represents the radial direction of the tire 102, the left-right direction represents the axial direction of the tire 102, and the direction orthogonal to the surface of the drawing sheet represents the circumferential direction of the tire 102. The band 120 is formed by a tape being wound on the outer side, in the radial direction, of the belt 116. The tape is helically wound almost in the circumferential direction from one of axially outer side ends of the belt 116 toward the other of the axially outer side ends thereof. Therefore, as shown in FIG. 5, on the cross-section obtained by cutting at a plane perpendicular to the circumferential direction, cross-sections 162 of the tape are aligned in the axial direction. The cross-sections 162 are aligned in the axial direction on the outer side of the belt 116. A distance over which the tape is fed when the tape is wound is greater than the width of the tape. Thus, gaps 164 are each formed between the cross-sections 162, of the tape, adjacent to each other, as shown in the drawings.

The tape is formed of a plurality of cords aligned with each other, and topping rubber, which is not shown. Each cord extends in the tape length direction. Therefore, in the band 120, the cords extend substantially in the circumferential direction. An angle of each cord relative to the circumferential direction is less than or equal to 5° and more preferably less than or equal to 2°. The band 120 has a so-called jointless structure. The belt 116 is held by the cords, whereby lifting of the belt 116 is inhibited. As described above, in the tire 102, the gaps 164 are formed between the cross-sections 162 of the tape. As compared to a conventional tire in which no gaps are formed between the cross-sections, an amount of the cords is reduced in the tire 102. The cords are formed of an organic fiber in general. Preferable examples of the organic fiber include nylon fibers, polyester fibers, rayon fibers, polyethylene naphthalate fibers, and aramid fibers.

The inner liner 122 is disposed inward of the carcass 114. The inner liner 122 is joined to the inner surface of the carcass 114. The inner liner 122 is formed of crosslinked rubber excellent in air-tightness. A typical base rubber of the inner liner 122 is isobutylene-isoprene-rubber or halogenated isobutylene-isoprene-rubber. The inner liner 122 maintains internal pressure of the tire 102.

The chafers 124 are disposed near the beads 112, respectively. The chafers 124 come into contact with the rim R. By the contact, portions near the beads 112 are protected. In the present embodiment, the chafers 124 are formed of a fabric and rubber impregnated into the fabric. The chafers 124 may be integrated with the clinches 108. In this case, a material of the chafers 124 is the same as the material of the clinches 108.

An action and effect of the present invention will be descried below.

In the pneumatic tire 102 according to the present invention, the filler 110 is disposed between the carcass 114 and the clinch 108. In the tire 102, the first turned-up portion 150*b* and the second main portion 152*a* of the carcass 114 are disposed at positions near the inner surface of the tire 102. In the tire 102, force in a compressing direction is prevented from acting in the first turned-up portion 150*b* and the second main portion 152*a*. In the tire 102, the carcass 114 is sufficiently tensioned. The carcass 114 contributes to stiffness. Therefore, even if the tire 102 is under a load equivalent to a load index, strain in the bead 112 portion is reduced. Deformation of the apex 146 is reduced. In the tire 102, flat spot due to the apex 146 being fixed in a deformed state is reduced as compared to a conventional tire. Further, reduction of flexure inhibits concentration of strain and heat generation. In the tire 102, the bead 112 portions are less likely to be damaged. The tire 102 is excellent in durability.

As described above, in the tire 102, a percentage of the complex elastic modulus E*f of the filler 110 relative to the complex elastic modulus E*a of the apex 146 is appropriately adjusted. Specifically, a ratio (E*f/E*a), in percentage, of the complex elastic modulus E*f of the filler 110 to the complex elastic modulus E*a of the apex 146 is greater than or equal to 70% and not greater than 125%. When the ratio (E*f/E*a) is greater than or equal to 70%, the fillers 110 contribute to stiffness. In the tire 102, even if the tire 102 is under a load equivalent to a load index, flexure in the bead 112 portion is reduced. This inhibits deformation of the apex 146. In the tire 102, flat spot due to the apex 146 being fixed in a deformed state is further reduced. Meanwhile, when the ratio (E*f/E*a) is not greater than 125%, the fillers 110 are not excessively hard. Stiffness of the bead 112 portions is appropriately maintained. This contributes to good ride comfort. The tire 102 allows good ride comfort to be maintained.

From the viewpoint of inhibiting deformation of the apex 146, the ratio (E*f/E*a) is more preferably greater than or equal to 90% and even more preferably greater than or equal to 100%. From the viewpoint of contribution to good ride comfort, the ratio is more preferably not greater than 110%.

The complex elastic modulus E*a of the apex 146 is preferably higher than or equal to 20 MPa and preferably not higher than 60 MPa. When the complex elastic modulus E*a is set to be higher than or equal to 20 MPa, deformation of the apex 146 is inhibited. In the tire 102, flat spot due to the apex 146 being fixed in a deformed state is effectively reduced. When the complex elastic modulus E*a is set to be not higher than 60 MPa, influence of the apex 146 on stiffness is reduced. The tire 102 is excellent in ride comfort.

The complex elastic modulus E*f of the filler 110 is preferably higher than or equal to 15 MPa and preferably not higher than 75 MPa. When the complex elastic modulus E*f is set to be higher than or equal to 15 MPa, the fillers 110 contribute to stiffness. In the bead 112 portions, flexure is effectively reduced. This inhibits deformation of the apex 146. In the tire 102, flat spot due to the apex 146 being fixed in a deformed state is effectively reduced. Further, reduction of flexure inhibits concentration of strain and heat generation. In the tire 102, the bead 112 portions are less likely to be damaged. The tire 102 is excellent in durability. Further, when the complex elastic modulus E*f is set to be not higher than 75 MPa, influence of the fillers 110 on stiffness is reduced. The tire 102 is excellent in ride comfort.

As described above, in the tire 102, increase of volume of the apexes 146 and the like for improving durability of the bead 112 portions need not be performed. This effectively contributes to prevention of flat spot due to the apex 146 being fixed in a deformed state. According to the present invention, the pneumatic tire 102 that allows flat spot to be prevented and durability to be improved without increasing the weight and cost, can be obtained.

As described above, in the tire 102, the carcass 114 is sufficiently tensioned. In the bead 112 portions, load is supported by the carcass 114, the apexes 146, and the fillers 110 in a well-balanced manner. When the tire 102 is under a load, pliable flexure occurs in the entirety of the tire 102. Strain is prevented from partially concentrating in the tire 102. Heat generation is prevented from being partially increased in the tire 102. Also in the tread 104, heat generation is inhibited from partially occurring. This contributes to improvement of high-speed durability in the tread 104. Thus, the cords of the band 120 can be reduced without reducing high-speed durability. In the tire 102, on the cross-section obtained by cutting at a plane perpendicular to the circumferential direction, the gaps 164 are each formed between the cross-sections 162, of the tape, adjacent to each other, whereby the cords of the band 120 are reduced as compared to a conventional tire. This inhibits generation of flat spot due to the cords of the band 120. Further, in the tire 102, heat generation is prevented from partially occurring in the tread 104, whereby contraction of the cords is prevented from being partially increased. In the tire 102, flat spot due to contraction of the cords of the band 120 is reduced without reducing high-speed durability.

In FIG. 5, a double-headed arrow TW represents a width of the tape of the band 120. This is the width of the cross-section 162. A double-headed arrow TD represents a width of the gap 164 between the cross-sections 162, of the tape, adjacent to each other. When TDa represents the average of all the widths TD, a ratio (TDa/TW), in percentage, of the average width TDa to the width TW is preferably greater than or equal to 30%. When the ratio (TDa/TW) is greater than or equal to 30%, the cords of the band 120 can be effectively reduced. In the tire 102, flat spot due to contraction of the cords of the band 120 is effectively reduced. In this viewpoint, the ratio (TDa/TW) is more preferably greater than or equal to 50%. The ratio (TDa/TW) is preferably not greater than 100%. When the ratio (TDa/TW) is not greater than 100%, the belt 116 can be appropriately held by the band 120. In the tire 102, high-speed durability is maintained so as to be high. In this viewpoint, the ratio (TDa/TW) is more preferably not greater than 90%.

In the tire 102 shown in FIG. 5, the width TD is uniform. At this time, the average width TDa is equal to the width TD. In this case, in the above relationship, the ratio (TD/TW) may be used instead of the ratio (TDa/TW).

The width TW is preferably greater than or equal to 9 mm. When the width TW is greater than or equal to 9 mm, a time required for winding the tape when the band 120 is formed is prevented from increasing. The band 120 allows high productivity to be maintained. In this viewpoint, the width TW is more preferably greater than or equal to 10 mm. The width TW is preferably not greater than 15 mm. When the width TW is not greater than 15 mm, portions in which the cords are disposed can be appropriately dispersed. This effectively contributes to reduction of flat spot. In this viewpoint, the width TW is more preferably not greater than 13 mm.

The width TD is preferably greater than or equal to 3 mm. When the width TD is greater than or equal to 3 mm, the cords of the band 120 can be effectively reduced. In the tire 102, flat spot due to contraction of the cords of the band 120 is effectively reduced. In this viewpoint, the width TD is more preferably greater than or equal to 5 mm. The width TD is preferably not greater than 9 mm. When the width TD is not greater than 9 mm, difference in stiffness between a portion in which the tape is disposed and a portion in which the tape is not disposed, can be reduced. Further, a width of a portion in which stiffness is low, is not excessively increased. This contributes to good high-speed durability.

In the tire 102, the thickness of the clinch 108 and the thickness of the filler 110 are measured along the line normal to the inner surface, in the axial direction, of the clinch 108. In FIG. 4, a double-headed arrow Tcx represents the maximum thickness of the clinch 108. That is, the clinch 108 has the maximum thickness Tcx. In FIG. 4, the normal line for the thickness Tcx is represented as a straight line L1. In the present invention, the normal line L1 is referred to as a first reference line. A double-headed arrow Tf1 represents the thickness, of the filler 110, which is measured along the first reference line L1. Further, in FIG. 4, a double-headed arrow Tfx represents the maximum thickness of the filler 110. That is, the filler 110 has the maximum thickness Tfx. In FIG. 4, the normal line for the thickness Tfx is represented as a straight line L2. In the present invention, the normal line L2 is referred to as a second reference line.

In the tire 102, a ratio of the thickness Tf1 to a sum (Tf1+Tcx) of the thickness Tf1 and the thickness Tcx is greater than or equal to 0.1 and not greater than 0.6. When the ratio is set to be greater than or equal to 0.1, the fillers 110 contribute to stiffness. In the tire 102, flexure is effectively reduced. Even if the tire 102 is under a load equivalent to a load index, flexure in the bead 112 portion is reduced. This inhibits deformation of the apex 146. In the tire 102, flat spot due to the apex 146 being fixed in a deformed state is reduced. Further, reduction of flexure inhibits concentration of strain and heat generation. In the tire 102, the bead 112 portions are less likely to be damaged. The tire 102 is excellent in durability. In this viewpoint, the ratio is preferably greater than or equal to 0.14 and more preferably greater than or equal to 0.20.

When the ratio is set to be not greater than 0.6, stiffness of the bead 112 portions is appropriately maintained. In the tire 102, flexure is appropriate in the bead 112 portion, whereby a position at which strain occurs due to the flexure is not specific. In the tire 102, strain is less likely to concentrate on the first turned-up portion 150b and the second main portion 152a. In the tire 102, the carcass 114 is less likely to be damaged. In this viewpoint, the ratio is preferably not greater than 0.50. Thus, by the thickness of the filler 110 being controlled, a degree of flexure of the bead 112 portion and a position at which strain occurs due to the flexure are adjusted. In the tire 102, the bead 112 portions are less likely to be damaged. The tire 102 is excellent in durability.

In FIG. 4, reference character P1 represents a point of intersection of the first reference line L1 and the inner surface, in the axial direction, of the clinch 108. A double-headed arrow H1 represents a height, in the radial direction, from the inner end 138 of the filler 110 to the point P1 of intersection. Reference character P2 represents a point of intersection of the second reference line L2 and the inner surface, in the axial direction, of the clinch 108. A double-headed arrow H2 represents a height, in the radial direction, from the inner end 138 of the filler 110 to the point P2 of intersection. A double-headed arrow Hf represents a height, in the radial direction, from the inner end 138 of the filler 110 to the outer end 142 thereof. The height Hf represents a height, in the radial direction, of the filler 110.

In the tire 102, a ratio of the height H2 to the height H1 is preferably greater than or equal to 0.6 and preferably not greater than 1.2. When the ratio is set to be greater than or equal to 0.6, a degree of curve, of the first turned-up portion 150b and the second main portion 152a, between the second reference line L2 and the core 144 is appropriately maintained. In the tire 102, the carcass 114 is sufficiently tensioned. The carcass 114 contributes to stiffness. Therefore, even if the tire 102 is under a load equivalent to a load index, flexure in the bead 112 portion is reduced. This contributes to prevention of flat spot due to the apex 146 being fixed in a deformed state. Further, reduction of flexure inhibits concentration of strain and heat generation. In the tire 102, the bead 112 portions are less likely to be damaged. The tire 102 is excellent in durability. In this viewpoint, the ratio is more preferably greater than or equal to 0.70. When the ratio is set to be not greater than 1.2, an outline (also referred to as a carcass line) of the carcass 114 in a zone from the maximum width position PW to the end 148 of the apex 146 is represented as an arc having an appropriate radius of curvature. In the tire 102, also in the sidewall 106 portions, strain is less likely to concentrate on the carcass 114. In the tire 102, the carcass 114 is less likely to be damaged. The tire 102 is excellent in durability. In this viewpoint, the ratio is more preferably not greater than 1.1.

In the tire 102, a ratio of the height H2 to the height Hf is preferably greater than or equal to 0.25 and preferably not greater than 0.5. When the ratio is set to be greater than or equal to 0.25, a degree of curve, of the first turned-up portion 150b and the second main portion 152a, between the second reference line L2 and the core 144 is appropriately maintained. In the tire 102, the carcass 114 is sufficiently tensioned. The carcass 114 contributes to stiffness. Therefore, even if the tire 102 is under a load equivalent to a load index, flexure in the bead 112 portion is reduced. This contributes to prevention of flat spot due to the apex 146 being fixed in a deformed state. Further, reduction of flexure inhibits concentration of strain and heat generation. In the tire 102, the bead 112 portions are less likely to be damaged. The tire 102 is excellent in durability. When the ratio is set to be not greater than 0.5, the carcass line in the zone from the maximum width position PW to the end 148 of the apex 146 is represented as an arc having an appropriate radius of curvature. In the tire 102, also in the sidewall 106 portions, strain is less likely to concentrate on the carcass 114. In the tire 102, the carcass 114 is less likely to be damaged. The tire 102 is excellent in durability.

In the tire 102, at a position (hereinafter, referred to as a position at the thickness Tcx) at which the clinch 108 has the maximum thickness Tcx, the filler 110 has the thickness Tf1, and the filler 110 contributes to pliable flexure at the bead 112 portion. Near the position at the thickness Tcx, the filler 110 has the maximum thickness Tfx, whereby the carcass 114 is sufficiently tensioned and the outline of the carcass 114 contributes to pliable flexure of the entirety of the tire 102 as well as the bead 112 portions. In the tire 102, concentration of strain is less likely to occur. Also in the tread 104, heat generation is inhibited from partially occurring. This contributes to improvement of high-speed durability in the tread 104. Thus, the cords of the band 120 can be reduced without reducing high-speed durability. In the tire 102, on the cross-section obtained by cutting at a plane perpendicular to the circumferential direction, the gaps 164 can be each formed between the cross-sections 162, of the tape, adjacent to each other. This reduces flat spot due to the cords of the band 120.

In FIG. 4, a double-headed arrow TA represents a thickness of the tire 102. The thickness TA is measured along the first reference line L1. The thickness TA is the thickness, of the tire 102, at the position at the thickness Tcx.

In the tire 102, the thickness TA is preferably greater than or equal to 10 mm and preferably not greater than 20 mm. When the thickness TA is set to be greater than or equal to 10 mm, the bead 112 portions have appropriate stiffness. Even if the tire 102 is under a load equivalent to a load index, flexure in the bead 112 portion is reduced. This contributes to prevention of flat spot due to the apex 146 being fixed in a deformed state. Further, reduction of flexure inhibits concentration of strain and heat generation. In the tire 102, the bead 112 portions are less likely to be damaged. The tire 102 is excellent in durability. In this viewpoint, the thickness TA is more preferably greater than or equal to 12 mm. When the thickness TA is set to be not greater than 20 mm, influence of the thickness TA on the weight and cost is reduced. Further, stiffness of the bead 112 portions is appropriately maintained, whereby the tire 102 is excellent in ride comfort. In this viewpoint, the thickness TA is more preferably not greater than 18 mm.

In the tire 102, the outer end 142 of the filler 110 is preferably disposed inward or outward of the outer end 134 of the clinch 108 in the radial direction. In other words, the outer end 142 of the filler 110 is preferably unequal to the outer end 134 of the clinch 108 in the radial direction. Thus, strain due to flexure is dispersed so as to occur at the outer end 142 of the filler 110 and the outer end 134 of the clinch 108, which are disposed at different positions, respectively. Dispersion of strain contributes to improvement of durability of the tire 102. In FIG. 4, a double-headed arrow Ds represents a distance, in the radial direction, from the outer end 134 of the clinch 108 to the outer end 142 of the filler 110. From the viewpoint of durability, the distance Ds is preferably greater than or equal to 5 mm in both a case where the outer end 142 of the filler 110 is disposed inward of the outer end 134 of the clinch 108 in the radial direction and a case where the outer end 142 of the filler 110 is disposed outward of the outer end 134 of the clinch 108 in the radial direction. From the viewpoint of dispersion of strain, the outer end 142 of the filler 110 is preferably distant from the outer end 134 of the clinch 108, whereby the upper limit of the distance Ds is not defined.

In FIG. 3, a double-headed arrow La represents a length of the apex 146. The length La is represented as a length from the center (reference character PC in FIG. 3), in the axial direction, of the bottom surface of the apex 146 to the end 148 thereof. A double-headed arrow Lf represents a length of the filler 110. The length Lf is represented as a length of a line segment that connects between the inner end 138 of the filler 110 and the outer end 142 thereof. A double-headed arrow Hc represents a height, in the radial direction, from the bead base line to the outer end 134 of the clinch 108. The height Hc represents the height of the clinch 108.

In the tire 102, the length La of the apex 146 is preferably less than or equal to 10 mm. When the length is set to be less than or equal to 10 mm, strain is prevented from concentrating on the end 148 of the apex 146. The tire 102 is excellent in durability. The length La is preferably not less than 5 mm. Thus, a degree of curve, of the first turned-up portion 150b and the second main portion 152a, between the second reference line L2 and the core 144 is appropriately maintained, and influence on durability is reduced.

In the tire 102, the length Lf of the filler 110 is preferably greater than or equal to 10 mm and preferably not greater than 50 mm. When the length Lf is set to be greater than or equal to 10 mm, the fillers 110 contribute to stiffness. In the tire 102, even if the tire 102 is under a load equivalent to a load index, flexure in the bead 112 portion is reduced. This contributes to prevention of flat spot due to the apex 146 being fixed in a deformed state. Further, reduction of flexure inhibits concentration of strain and heat generation. In the tire 102, the bead 112 portions are less likely to be damaged. The tire 102 is excellent in durability.

When the length Lf is set to be not greater than 50 mm, stiffness is appropriately maintained in a portion inward of the maximum width position PW. Pliable flexure occurs in the entirety of the tire 102. In the tire 102, concentration of strain is less likely to occur. Also in the tread 104, heat generation is inhibited from partially occurring. This contributes to improvement of high-speed durability in the tread 104. Thus, the cords of the band 120 can be reduced without reducing high-speed durability. In the tire 102, on the cross-section obtained by cutting at a plane perpendicular to the circumferential direction, the gaps 164 can be each formed between the cross-sections 162, of the tape, adjacent to each other. This inhibits generation of flat spot due to the cords of the band 120. Further, in the tire 102, strain is less likely to concentrate on the outer end 142 of the filler 110 and the end 154 of the first turned-up portion 150b. The tire 102 is excellent in durability.

In the tire 102, the height Hc of the clinch 108 is preferably greater than or equal to 30 mm and preferably not greater than 60 mm. When the height Hc is set to be greater than or equal to 30 mm, the sidewall 106 which is more flexible than the clinch 108 is prevented from contacting with the flange F. In the tire 102, damage (also referred to as rim chafing) in which volume of the bead 112 portion is reduced due to rubbing against the flange F, is prevented. When the height Hc is set to be not greater than 60 mm, stiffness is appropriately maintained in a portion inward of the maximum width position PW. Pliable flexure occurs in the entirety of the tire 102. Further, in the tire 102, strain is less likely to concentrate on the outer end 134 of the clinch 108 and the end 154 of the first turned-up portion 150b. The tire 102 is excellent in durability.

As described above, the clinch 108 comes into contact with the flange F of the rim R. The clinches 108 are required to have wear resistance in order to prevent reduction of volume due to rubbing against the flange F. The fillers 110 are layered over the clinches 108, whereby balance between stiffness of the clinches 108 and stiffness of the fillers 110 is also important in view of concentration of strain. In view of balance in wear resistance and stiffness, a ratio ($E^*c/E^*f$), in percentage, of the complex elastic modulus $E^*c$ of the clinch 108 to the complex elastic modulus $E^*f$ of the filler 110 is preferably greater than or equal to 70% and preferably not greater than 125%.

In the tire 102, the complex elastic modulus $E^*c$ of the clinch 108 is preferably higher than or equal to 10 MPa and preferably not higher than 90 MPa. When the complex elastic modulus $E^*c$ is set to be higher than or equal to 10 MPa, the clinches 108 contribute to stiffness. In the tire 102, flexure is effectively reduced. Reduction of flexure inhibits concentration of strain and heat generation. The tire 102 is excellent in durability. When the complex elastic modulus $E^*c$ is set to be not higher than 90 MPa, influence of the clinches 108 on stiffness is reduced. The tire 102 is excellent in ride comfort.

Third Embodiment

Figure 6:
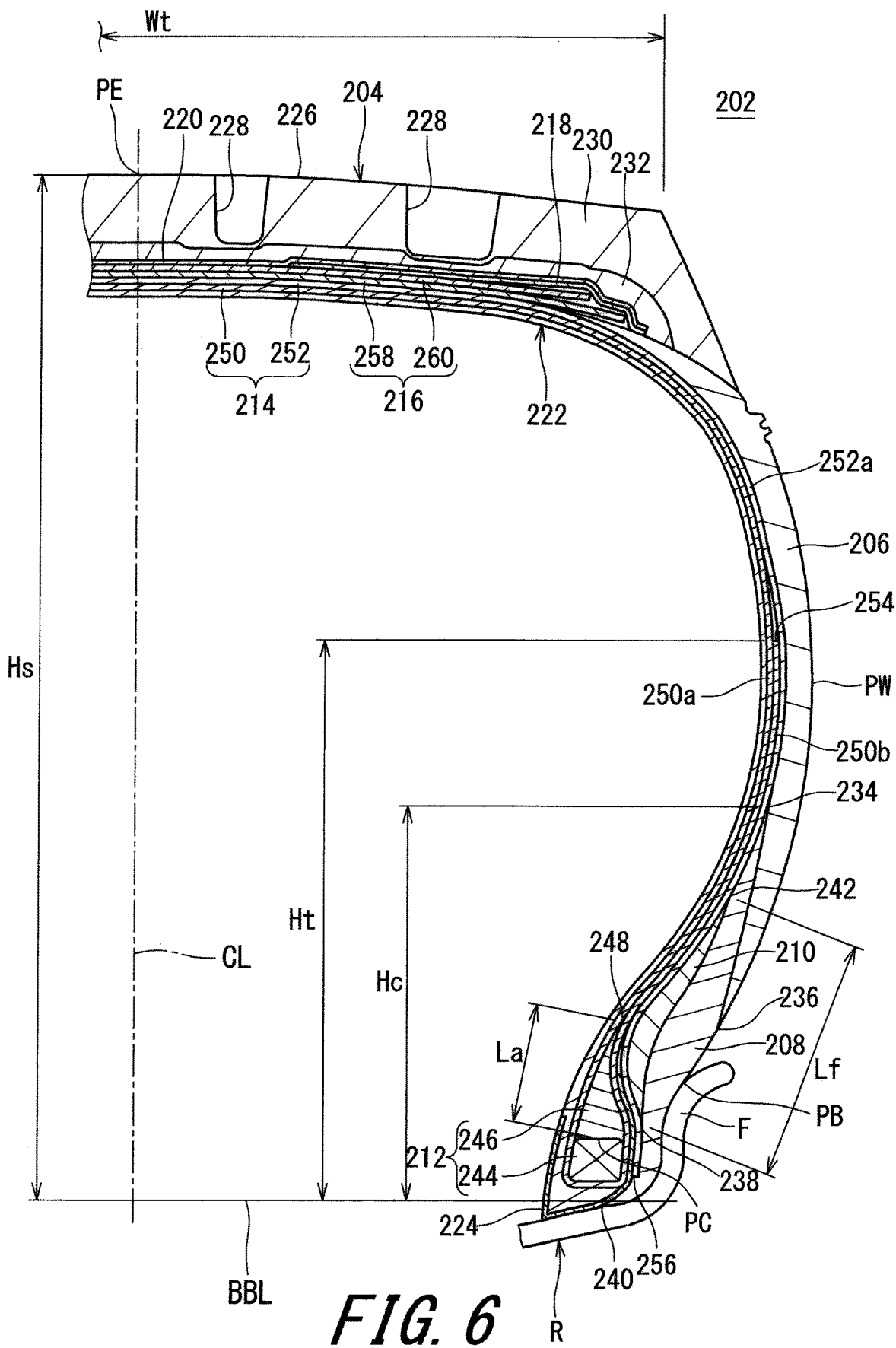
FIG. 6 is a cross-sectional view of a part of a pneumatic tire according to still another embodiment of the present invention.

FIG. 6 shows a pneumatic tire 202. In FIG. 6, the up-down direction represents the radial direction of the tire 202, the left-right direction represents the axial direction of the tire 202, and the direction orthogonal to the surface of the drawing sheet represents the circumferential direction of the tire 202. In FIG. 6, an alternate long and short dash line CL represents the equator plane of the tire 202. The tire 202 has a shape that is symmetric with respect to the equator plane except for a tread pattern.

The tire 202 is mounted on a rim R. The rim R is a normal rim. The tire 202 is inflated with air. The internal pressure of the tire 202 is a normal internal pressure.

In FIG. 6, reference character PB represents a position at an outer side edge, in the radial direction, of a contact surface obtained by the outer surface, in the axial direction, of the tire 202 and the flange surface of the rim R contacting with each other. The position PB is obtained when the tire 202 is mounted on the rim R and inflated with air to a normal internal pressure. At this time, no load is applied to the tire 202. The position PB is a separation point.

In FIG. 6, a solid line BBL represents a bead base line. A double-headed arrow Hs represents a height, in the radial direction, from the bead base line to an equator PE of the tire 202. The height Hs represents the cross-sectional height of the tire 202.

In FIG. 6, reference character PW represents a specific position on the outer surface, in the axial direction, of the tire 202. The tire 202 has, at the positions PW, the maximum width in the axial direction on a profile of the outer surface. The position PW represents the maximum width position of the tire 202.

The tire 202 includes a tread 204, a pair of sidewalls 206, a pair of clinches 208, a pair of fillers 210, a pair of beads 212, a carcass 214, a belt 216, a band 220, an inner liner 222, and a pair of chafers 224. The tire 202 is of a tubeless type. The tire 202 is mounted to, for example, a small truck.

The tread 204 has a shape that projects outward in the radial direction. The tread 204 forms a tread surface 226 that comes into contact with a road surface. The tread 204 has grooves 228 formed therein. A tread pattern is formed by the grooves 228. The tread 204 has a cap layer 230 and a base layer 232. The cap layer 230 is disposed outward of the base layer 232 in the radial direction. The cap layer 230 is layered over the base layer 232. The cap layer 230 is formed of crosslinked rubber excellent in wear resistance, heat resistance, and grip performance. The base layer 232 is formed of crosslinked rubber excellent in adhesiveness. A typical base rubber of the base layer 232 is natural rubber.

The sidewalls 206 extend almost inward from ends, respectively, of the tread 204 in the radial direction. The outer side portions, in the radial direction, of the sidewalls 206 are jointed to the tread 204. The inner side portions, in the radial direction, of the sidewalls 206 are jointed to the clinches 208. The sidewalls 206 are disposed outward of the carcass 214 in the axial direction. The sidewalls 206 are formed of crosslinked rubber excellent in cut resistance and weather resistance. The sidewalls 206 prevent damage to the carcass 214.

The clinches 208 are disposed inward of the sidewalls 206, respectively, in the radial direction. The clinches 208 are disposed outward of the beads 212, the carcass 214, and the fillers 210 in the axial direction. The clinches 208 are tapered outward in the radial direction. The clinches 208 are tapered inward in the radial direction. The clinches 208 are formed of crosslinked rubber excellent in wear resistance. The clinch 208 comes into contact with a flange F of the rim R. In FIG. 6, a double-headed arrow Hc represents a height, in the radial direction, from the bead base line to an outer end 234 of the clinch 208. The height Hc represents the height of the clinch 208.

In the tire 202, the outer end 234 of the clinch 208 is disposed outward of an inner end 236 of the sidewall 206 in the radial direction. The outer end 234 of the clinch 208 is covered with the sidewall 206, which is shown in the drawings. The inner end 236 of the sidewall 206 is disposed on the outer surface, in the axial direction, of the tire 202.

A complex elastic modulus $E^*c$ of the clinch 208 is preferably higher than or equal to 10 MPa and preferably not higher than 90 MPa. When the complex elastic modulus $E^*c$ is set to be higher than or equal to 10 MPa, the clinches 208 contribute to stiffness. In the tire 202, flexure is effectively reduced. Reduction of flexure inhibits concentration of strain and heat generation. The clinches 208 contribute to improvement of durability of the tire 202. When the complex elastic modulus $E^*c$ is set to be not higher than 90 MPa, degradation of ride comfort is inhibited.

The fillers 210 are disposed inward of the clinches 208, respectively, in the axial direction. The fillers 210 are layered over the clinches 208 in portions outward of the carcass 214 in the axial direction. The fillers 210 are tapered outward in the radial direction. The fillers 210 are tapered inward in the radial direction. The inner surfaces, in the axial direction, of the fillers 210 are layered over the carcass 214. As shown in FIG. 6, the inner surface in the axial direction is curved so as to project inward in the axial direction. In FIG. 6, a double-headed arrow Lf represents a length of the filler 210. The length Lf represents a length of a line segment that connects between an inner end 238 of the filler 210 and an outer end 242 thereof.

In the tire 202, the inner end 238 of the filler 210 is disposed outward of an inner end 240 of the clinch 208 in the radial direction. The inner end 238 of the filler 210 is covered with the clinch 208. The outer end 242 of the filler 210 is disposed inward of the outer end 234 of the clinch 208 in the radial direction. The outer end 242 of the filler 210 is covered with the clinch 208. The outer end 242 of the filler 210 may be disposed outward of the outer end 234 of the clinch 208. In this case, the outer end 242 of the filler 210 is covered with the sidewall 206.

In the tire 202, the inner end 238 of the filler 210 is preferably disposed inward of the separation point PB in the radial direction. In other words, a part of the filler 210 is preferably disposed inward of the separation point PB in the radial direction. Thus, a part of the filler 210 is disposed between the bead 212 and the flange F, whereby the filler 210 acts against deformation of the bead 212 portion. The fillers 210 contribute to pliable flexure of the bead 212 portions. Concentration of strain and heat generation are inhibited, and the tire 102 is thus excellent in durability.

The fillers 210 are formed by a rubber composition being crosslinked. In other words, the fillers 210 are formed of crosslinked rubber. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more kinds of rubbers may be used in combination.

The rubber composition of the fillers 210 contains a reinforcing agent. The reinforcing agent is typically carbon black. Carbon black such as FEF, GPF, HAF, ISAF, SAF, and the like can be used. From the viewpoint of inhibiting heat generation due to deformation, silica may be used in addition to or instead of the carbon black. In this case, dry silica and wet silica can be used. From the viewpoint of strength of the fillers 210, an amount of the reinforcing agent with respect to 100 parts by weight of the base rubber is preferably greater than or equal to 5 parts by weight. From the viewpoint of flexibility of the fillers 210, an amount of the reinforcing agent is preferably not greater than 50 parts by weight.

To the rubber composition of the fillers 210, a crosslinking agent, a softener, stearic acid, zinc oxide, an antioxidant, a wax, a crosslinking activator, and the like are added as appropriate.

A complex elastic modulus E*f of the filler 210 is preferably higher than or equal to 15 MPa and preferably not higher than 75 MPa. When the complex elastic modulus E*f is set to be higher than or equal to 15 MPa, the fillers 210 contribute to stiffness. In the bead 212 portions, flexure is effectively reduced. This reduces deformation of an apex 246 described below. The tire 202 is excellent in durability. Further, when the complex elastic modulus E*f is set to be not higher than 75 MPa, degradation of ride comfort is inhibited.

The beads 212 are disposed inward of the fillers 210, respectively, in the radial direction. The beads 212 are disposed inward of the fillers 210 and the clinches 208, respectively, in the axial direction. Each bead 212 includes a core 244 and an apex 246. The core 244 is ring-shaped. The core 244 includes a wound non-stretchable wire. A typical material of the wire is steel. The apex 246 extends outward from the core 244 in the radial direction. The apex 246 is tapered outward in the radial direction. An end 248 of the apex 246 is disposed outward of the inner end 238 of the filler 210 in the radial direction. The end 248 of the apex 246 is disposed inward of the outer end 242 of the filler 210 in the radial direction. In FIG. 6, a double-headed arrow La represents the length of the apex 246. The length La represents the length from the center (reference character PC in FIG. 6), in the axial direction, of the bottom surface of the apex 246 to the end 248 thereof.

The apex 246 is formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more kinds of rubbers may be used in combination.

The rubber composition of the apex 246 contains a reinforcing agent. The reinforcing agent is typically carbon black. Carbon black such as FEF, GPF, HAF, ISAF, SAF, and the like can be used. From the viewpoint of inhibiting heat generation due to deformation, silica may be used in addition to or instead of the carbon black. In this case, dry silica and wet silica can be used. From the viewpoint of strength of the apex 246, an amount of the reinforcing agent with respect to 100 parts by weight of the base rubber is preferably greater than or equal to 5 parts by weight. From the viewpoint of flexibility of the apex 246, an amount of the reinforcing agent is preferably not greater than 50 parts by weight.

To the rubber composition of the apex 246, a crosslinking agent, a softener, stearic acid, zinc oxide, an antioxidant, a wax, a crosslinking activator, and the like are added as appropriate.

The apex 246 may be formed by crosslinking of the same rubber composition as that of the filler 210. In other words, the material of the filler 210 may be the same as the material of the apex 246. Narrowing of kinds of rubber compositions used for the tire 202 contributes to reduction of cost of the tire 202.

A complex elastic modulus E*a of the apex 246 is preferably higher than or equal to 20 MPa and preferably not higher than 60 MPa. When the complex elastic modulus E*a is set to be higher than or equal to 20 MPa, deformation of the apex 246 is inhibited. When the complex elastic modulus E*a is set to be not higher than 60 MPa, degradation of ride comfort is inhibited.

In the tire 202, preferably, a ratio between the complex elastic modulus E*a of the apex 246 and the complex elastic modulus E*f of the filler 210 is appropriately adjusted. Specifically, a ratio (E*f/E*a), in percentage, of the complex elastic modulus E*f of the filler 210 to the complex elastic modulus E*a of the apex 246 is greater than or equal to 70% and not greater than 125%.

The carcass 214 includes a first carcass ply 250 and a second carcass ply 252. The first carcass ply 250 and the second carcass ply 252 are each extended on and between the beads 212 on both sides. The first carcass ply 250 and the second carcass ply 252 extend along the tread 204 and the sidewalls 206. The first carcass ply 250 and the second carcass ply 252 are each formed of multiple cords aligned with each other, and topping rubber. An absolute value of an angle of each cord relative to the equator plane is from 75° to 90°. In other words, the carcass 214 forms a radial structure. The cords are formed of an organic fiber. Preferable examples of the organic fiber include polyester fibers, nylon fibers, rayon fibers, polyethylene naphthalate fibers, aramid fibers, and polyketone fibers.

In the tire 202, the first carcass ply 250 is turned up around the cores 244 from the inner side toward the outer side in the axial direction. By the turning-up, the first carcass ply 250 includes a first main portion 250a and first turned-up portions 250b. The second carcass ply 252 is disposed outward of the first carcass ply 250. The second carcass ply 252 covers ends 254 of the first turned-up portions 250b. Ends 256 of the second carcass ply 252 are disposed outward of the beads 212 in the axial direction. In the tire 202, the second carcass ply 252 is not turned up around the cores 244. Therefore, the second carcass ply 252 has no turned-up portions. The second carcass ply 252 merely has a main portion 252a (hereinafter, referred to as a second main portion 252a). In the tire 202, the second carcass ply 252 may be turned up around the cores 244 from the inner side toward the outer side in the axial direction. The carcass 214 may be formed from one carcass ply, that is, may be formed merely from the first carcass ply 250.

In FIG. 6, a double-headed arrow Ht represents a height, in the radial direction, from the bead base line to the end 254 of the first turned-up portion 250b. As is apparent from FIG. 6, the ends 254 of the first turned-up portions 250b are each disposed near the maximum width position PW. In the tire 202, the carcass 214 has a "highly turned-up (HTU)" structure. In the tire 202, the carcass 214 may be formed such that the ends 254 of the first turned-up portions 250b are disposed near the beads 212.

The belt 216 is disposed inward of the tread 204 in the radial direction. The belt 216 and the carcass 214 are layered over each other. The belt 216 reinforces the carcass 214. The belt 216 includes an inner layer 258 and an outer layer 260. As is apparent from FIG. 6, the width of the inner layer 258 is slightly greater than the width of the outer layer 260 in the axial direction. The inner layer 258 and the outer layer 260 are each formed of multiple cords aligned with each other, and topping rubber, which is not shown. Each cord is tilted relative to the equator plane. An absolute value of the tilt angle is greater than or equal to 10° and not greater than 35° in general. A direction in which the cords of the inner layer 258 are tilted relative to the equator plane is opposite to a direction in which the cords of the outer layer 260 are tilted relative to the equator plane. A material of the cords is preferably steel. An organic fiber may be used for the cords. The width, in the axial direction, of the belt 216 is preferably greater than or equal to 0.7 times the maximum width of the tire 202. The belt 216 may include three or more layers.

The band 220 is disposed outward of the belt 216 in the radial direction. The band 220 is disposed inward of the tread 204 in the radial direction. The band 220 is a full band.

The inner liner 222 is disposed inward of the carcass 214. The inner liner 222 is joined to the inner surface of the carcass 214. The inner liner 222 is formed of crosslinked rubber excellent in air-tightness. A typical base rubber of the inner liner 222 is isobutylene-isoprene-rubber or halogenated isobutylene-isoprene-rubber. The inner liner 222 maintains internal pressure of the tire 202.

The chafers 224 are disposed near the beads 212, respectively. The chafers 224 come into contact with the rim R. By the contact, portions near the beads 212 are protected. In the present embodiment, the chafers 224 are formed of a fabric and rubber impregnated into the fabric. The chafers 224 may be integrated with the clinches 208. In this case, a material of the chafers 224 is the same as the material of the clinches 208.

Figure 7:
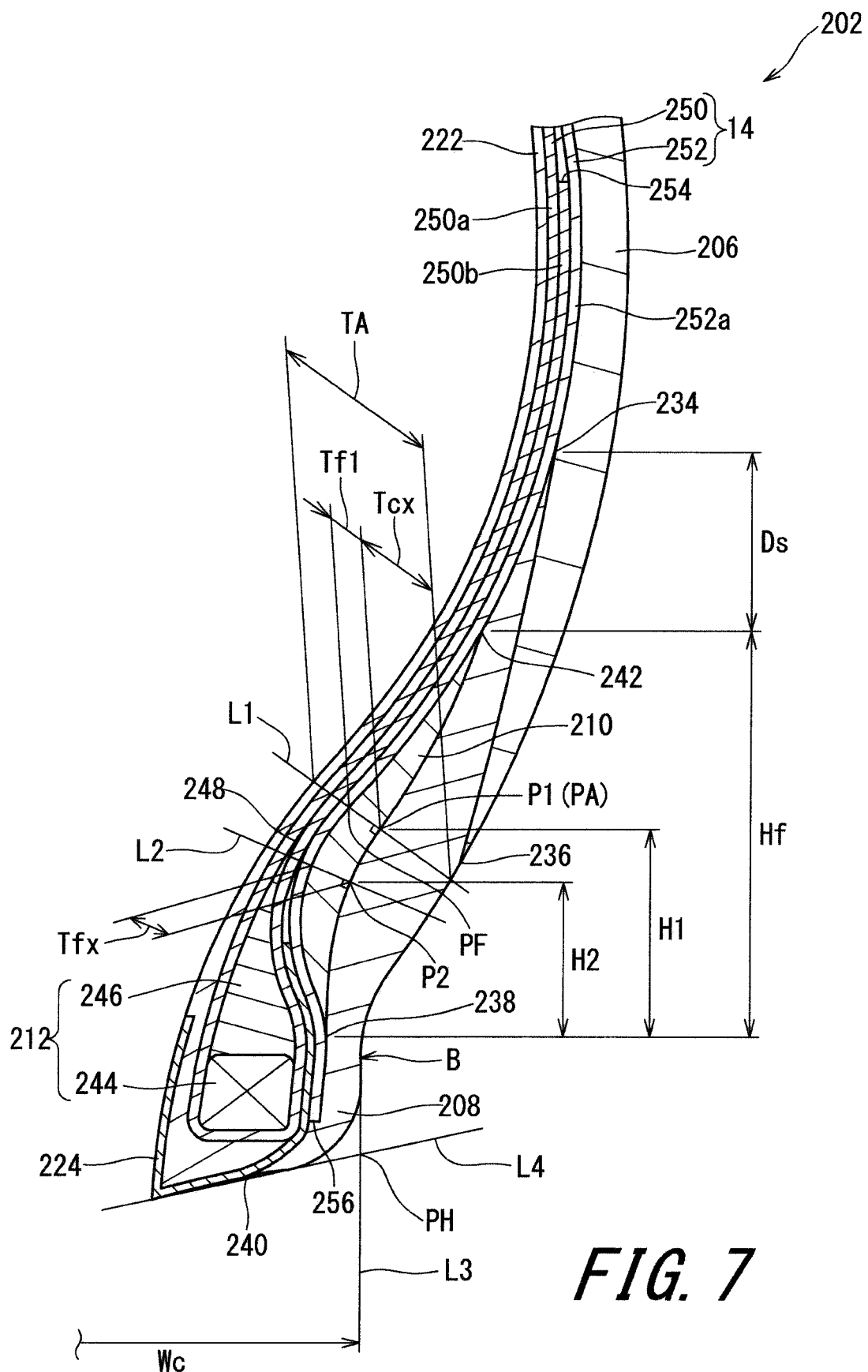
FIG. 7 is an enlarged cross-sectional view of a bead portion of the tire shown in FIG. 6.

FIG. 7 shows a bead portion B of the tire 202. In the present invention, the bead portion B includes, for example, the bead 212, and the clinch 208, the filler 210, and the inner liner 222 near the bead 212. As shown in FIG. 7, the first turned-up portion 250b and the second main portion 252a are disposed between the filler 210 and the apex 246. The size of the apex 246 is smaller than the size of an apex of a conventional tire having no fillers. The first turned-up portion 250b and the second main portion 252a extend along the inner surface, in the axial direction, of the filler 210. The first turned-up portion 250b and the second main portion 252a are curved in a portion inward of the filler 210 in the axial direction, so as to project inward. The first turned-up portion 250b and the second main portion 252a are disposed closer to the inner surface of the tire 202 (bead portion B) in the axial direction than to the outer surface. In the tire 202, the first turned-up portion 250b and the second main portion 252a are disposed closer to the inner surface, in the axial direction, of the tire 202 as compared to a conventional tire having no fillers.

In FIG. 7, a double-headed arrow Tcx represents the maximum thickness of the clinch 208. That is, the clinch 208 has the maximum thickness Tcx. The normal line for the thickness Tcx is represented as a straight line L1. In the present invention, the normal line L1 is referred to as a first reference line. A double-headed arrow Tf1 represents the thickness, of the filler 210, measured along the first reference line L1. A double-headed arrow TA represents the thickness of the tire 202. The thickness TA is measured along the first reference line L1. The thickness TA represents the thickness of the tire 202 at the position at the thickness Tcx. Further, a double-headed arrow Tfx represents the maximum thickness of the filler 210. That is, the filler 210 has the maximum thickness Tfx. The normal line for the thickness Tfx is represented as a straight line L2. In the present invention, the normal line L2 is referred to as a second reference line.

In the tire 202, the thickness of the clinch 208 and the thickness of the filler 210 are measured along the line normal to the inner surface, in the axial direction, of the clinch 208. Therefore, the thickness TA is measured along the line normal to the inner surface, in the axial direction, of the clinch 208.

In FIG. 7, reference character P1 represents a point of intersection of the first reference line L1 and the inner surface, in the axial direction, of the clinch 208. A double-headed arrow H1 represents a height, in the radial direction, from the inner end 238 of the filler 210 to the point P1 of intersection. Reference character P2 represents a point of intersection of the second reference line L2 and the inner surface, in the axial direction, of the clinch 208. A double-headed arrow H2 represents a height, in the radial direction, from the inner end 238 of the filler 210 to the point P2 of intersection. A double-headed arrow Hf represents a height, in the radial direction, from the inner end 238 of the filler 210 to the outer end 242 thereof. The height Hf represents the height, in the radial direction, of the filler 210.

In FIG. 7, reference character PF represents a point of intersection of the first reference line L1 and the inner surface, in the axial direction, of the filler 210. Reference character PA represents the mid-point of the thickness TA, of the tire 202, measured along the first reference line. In the tire 202, the position of the mid-point PA is equal to the position of the point P1 of intersection. The position of the mid-point PA may be different from the position of the point P1 of intersection.

A straight line L3 represents an extension line of the outer surface, in the axial direction, of the clinch 208 that contacts with the flange of the rim. A straight line L4 represents an extension line of a bottom surface, of the bead portion B, which contacts with a seat surface of the rim. Reference character PH represents a point of intersection of the straight line L3 and the straight line L4. The point PH represents a position of the bead heel of the tire 202. A double-headed arrow Wc represents a distance, in the axial direction, from one of the bead heels to the other of the bead heels. The width Wc is measured before the tire 202 is mounted on the rim. The width Wc represents an initial clip width.

Figure 8:
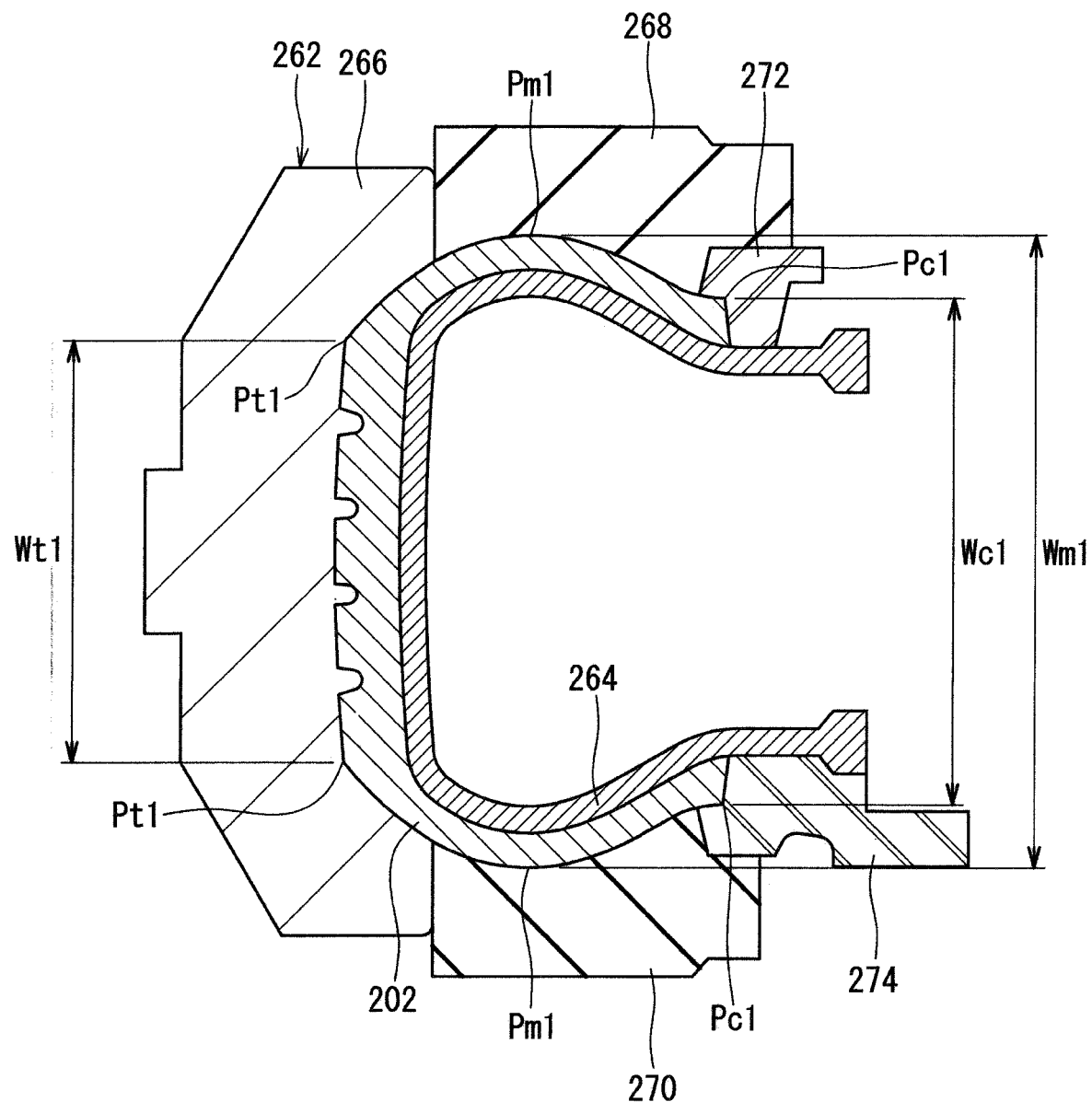
FIG. 8 illustrates a mold and a bladder for vulcanization-molding the tire shown in FIG. 6.

FIG. 8 shows a mold 262 and a bladder 264 for vulcanization-molding the tire 202. In FIG. 8, the up-down direction represents the axial direction of the mold 262, the left-right direction represents the radial direction of the mold 262, and the direction orthogonal to the surface of the drawing sheet represents the circumferential direction of the mold 262. The radial direction, the axial direction, and the circumferential direction of the mold 262 correspond to the radial direction, the axial direction, and the circumferential direction, respectively, of the tire 202.

A method for manufacturing the tire 202 includes a preforming step and a vulcanization step, which are not shown. In the preforming step, members such as rubber compositions of the tread 204, the sidewalls 206, the clinches 208, and the like are attached to each other to obtain a raw cover (an uncrosslinked tire). In the vulcanization step, the raw cover is put into the mold 262. The internal pressure of the bladder 264 is enhanced. The raw cover is pressurized between the cavity surface of the mold 262 and the outer surface of the bladder 264. The raw cover is heated by heat conduction from the mold 262 and the bladder 264. By the pressurizing and heating, crosslinking reaction occurs in the rubber compositions. In the vulcanization step, the raw cover is vulcanization-molded to obtain the tire 202.

The mold 262 includes a tread segment 266, an upper side plate 268, a lower side plate 270, an upper bead ring 272, and a lower bead ring 274. The outer surface of the tire 202 is molded by the tread segment 266, the upper side plate 268, the lower side plate 270, the upper bead ring 272, and the lower bead ring 274.

In FIG. 8, positions Pc1 each represents a point of intersection of: an extension line of the cavity surface, of the mold 262 (the upper bead ring 272 and the lower bead ring 274), for forming the outer surface, in the axial direction, of the bead portion B; and an extension line of the cavity surface, of the mold 262 (the upper bead ring 272 and the lower bead ring 274), for forming the bottom surface (the inner side surface in the radial direction) of the bead portion B. Positions Pt1 represent the ends, in the axial direction, of the cavity surface for forming the tread surface 226. Positions Pm1 represent points, on the cavity surfaces for forming the sidewalls 206, at which a distance therebetween in the axial direction is maximum. Specifically, the positions Pm1 represent points, on the cavity surfaces for forming the sidewalls 206, at which the distance, in the axial direction, of the mold is maximum. More specifically, the positions Pm1 represent points at which a distance, in the axial direction, from the cavity surface for forming one of the sidewalls 206 to the cavity surface for forming the other of the sidewalls 206 is maximum.

In FIG. 8, a double-headed arrow Wc1 represents a distance, in the axial direction, from one of the positions Pc1 in the axial direction to the other of the positions Pc1 in the axial direction. The double-headed arrow Wc1 represents a clip width of the mold 262. A double-headed arrow Wt1 represents a distance, in the axial direction, from one of the positions Pt1 in the axial direction to the other of the positions Pt1 in the axial direction. The double-headed arrow Wt1 represents a tread width of the mold 262. A double-headed arrow Wm1 represents a distance, in the axial direction, from one of the positions Pm1 in the axial direction to the other of the positions Pm1 in the axial direction. The double-headed arrow Wm1 represents a mold width of the mold 262. The mold width Wm1 of the mold 262 is the maximum width of the mold 262.

In the tire 202, the initial clip width Wc is defined by the clip width Wc1 of the mold 262. In the present invention, the initial clip width Wc represents a clip width which is measured in the tire 202 in a normal temperature state after vulcanization-molding in the mold 262. The initial clip width Wc is measured before mounting on a rim. An initial tread width Wt is defined by the tread width Wt1 of the mold 262. The initial tread width Wt is represented as the width, in the axial direction, from one of ends of the tread surface 226 to the other of the ends thereof. The initial tread width Wt is measured before the tire 202 is mounted on the rim, similarly to the initial clip width Wc.

In the mold 262, a ratio (Wc1/Wm1) of the clip width Wc1 of the mold 262 to the maximum width Wm1 of the mold 262 is greater than or equal to 0.80. In the mold 262, the clip width Wc1 relative to the maximum width Wm1 of the mold 262 is widened as compared to a conventional one. The tire 202 molded by the mold 262 is excellent in air-in performance. A ratio (Wc1/Wt1) of the clip width Wc1 of the mold 262 to the tread width Wt1 of the mold 262 is greater than or equal to 0.95. In the mold 262, the clip width Wc1 relative to the tread width Wt1 of the mold 262 is widened as compared to a conventional one. The tire 202 molded by the mold 262 is more excellent in air-in performance.

Similarly, in the tire 202, a ratio (Wc/Wt) of the initial clip width Wc to the initial tread width Wt is greater than or equal to 0.90. In the tire 202, the initial clip width Wc is widened as compared to a conventional one. The tire 202 is excellent in air-in performance.

Meanwhile, in the mold 262, the ratio (Wc1/Wm1) is not greater than 0.90. In the tire 202 molded by the mold 262 in which the ratio (Wc1/Wm1) is small, deformation of the bead portion B in the case of the tire being mounted on a rim is reduced. The tire 202 is excellent in durability. In this viewpoint, the ratio (Wc1/Wm1) is preferably not greater than 0.88 and more preferably not greater than 0.86. Further, in the mold 262, the ratio (Wc1/Wt1) is not greater than 1.10, whereby the tire 202 is more excellent in durability. In this viewpoint, the ratio (Wc1/Wt1) is preferably not greater than 1.08 and more preferably not greater than 1.06.

In the tire 202, the ratio (Wc/Wt) is not greater than 1.00. The tire 202 is excellent in durability. In this viewpoint, the ratio (Wc/Wt) is preferably not greater than 0.98 and more preferably not greater than 0.96.

In the tire 202, the point PF of intersection of the first reference line L1 and the inner surface, in the axial direction, of the filler 210 is disposed inward of the mid-point PA of the thickness TA of the tire in the axial direction. At a position of the first reference line L1, the carcass 214 extends through a position closer to the inner surface than to the outer surface in the axial direction of the tire 202. In the tire 202, the first turned-up portion 250b and the second main portion 252a of the carcass 214 are disposed closer to the inner surface of the tire 202. In the tire 202, force in a compressing direction is inhibited from acting in the first turned-up portion 250b and the second main portion 252a. In the tire 202, the carcass 214 is sufficiently tensioned. The carcass 214 contributes to stiffness. Therefore, even if the tire 202 is under a heavy load, strain in the bead 212 portion is reduced. Deformation of the apex 246 is reduced. In the tire 202, even if the ratio (Wc1/Wt1) and the ratio (Wc1/Wm1) are increased as compared to a conventional tire, strain around the bead portion B is reduced. In the tire 202, loosening is less likely to occur between the beads 212 and the carcass 214. In the tire 202, the clip width Wc can be increased, as compared to a conventional one, without reducing durability.

In the tire 202, durability in the bead portion B can be improved without increasing volume of rubber of the bead portion B. In the tire 202, the thickness TA can be reduced while durability is maintained so as to be sufficient. Reduction of the thickness TA contributes to reduction of the weight of the tire 202. In this viewpoint, the thickness TA is preferably less than or equal to 20 mm and more preferably less than or equal to 18 mm. Meanwhile, in the tire 202 in which the thickness TA is great, the bead portion B is excellent in durability. In this viewpoint, the thickness TA is preferably not less than 10 mm and more preferably not less than 12 mm.

In the tire 202 in which the length La of the apex 246 is great, a degree of curve, of the first turned-up portion 250b and the second main portion 252a, between the second reference line L2 and the core 244 is maintained so as to be an appropriate degree. Thus, loosening is less likely to occur between the carcass 214 and the apex 246. Thus, durability becomes sufficient. In this viewpoint, the length La is preferably greater than or equal to 5 mm. Meanwhile, in the tire 202 in which the length La is small, strain is prevented from concentrating on the end 248 of the apex 246. The tire 202 is excellent in durability. In this viewpoint, the length La is preferably not greater than 20 mm, more preferably not greater than 15 mm, and particularly preferably not greater than 10 mm.

In the tire 202 in which a ratio (Tf1/(Tf1+Tcx)) of the thickness Tf1 to a sum (Tf1+Tcx) of the thickness Tf1 and the thickness Tcx is great, the fillers 210 contribute to improvement of stiffness. By the increase of the ratio, flexure is effectively reduced in the tire 202. Even if the tire 202 is under a heavy load, flexure in the bead portion B is reduced. Deformation of the apex 246 is reduced. In this viewpoint, the ratio (Tf1/(Tf1+Tcx)) is preferably greater than or equal to 0.1 and more preferably greater than or equal to 0.2.

In the tire 202 in which the ratio (Tf1/(Tf1+Tcx)) is small, flexure is inhibited from partially occurring. Strain is less likely to concentrate on the first turned-up portion 250b and the second main portion 252a. In the tire 202, the carcass 214 is less likely to be damaged. The tire 202 is excellent in durability. In this viewpoint, the ratio is preferably not greater than 0.6 and more preferably not greater than 0.5. Thus, the thickness Tf1 of the filler 210 is controlled, whereby a degree of flexure in the bead 212 position and a position at which strain occurs due to the flexure are adjusted.

Increase of a percentage of the complex elastic modulus E*f of the filler 210 relative to the complex elastic modulus E*a of the apex 246 contributes to improvement of stiffness. Even if the tire 202 is under a heavy load, flexure in the bead portion B of the tire 202 is reduced. Deformation of the apex 246 is reduced. In this viewpoint, the ratio (E*f/E*a) in percentage is preferably greater than or equal to 70%, more preferably greater than or equal to 90%, and particularly preferably greater than or equal to 100%. Meanwhile, when the ratio (E*f/E*a) is excessively great, stiffness becomes excessively great and ride comfort is degraded. In this viewpoint, the ratio (E*f/E*a) in percentage is preferably not greater than 125% and more preferably not greater than 110%.

In the tire 202 in which a ratio (H2/H1) of the height H2 to the height H1 is great, a degree of curve, of the first turned-up portion 250b and the second main portion 252a, between the second reference line L2 and the core 244, is maintained so as to be an appropriate degree. In the tire 202, the carcass 214 is sufficiently tensioned. The carcass 214 contributes to stiffness. Therefore, even if the tire 202 is under a heavy load, flexure in the bead 212 portion is reduced. Reduction of flexure inhibits concentration of strain and heat generation. The tire 202 is excellent in durability. In this viewpoint, the ratio (H2/H1) is preferably greater than or equal to 0.6 and more preferably greater than or equal to 0.7. In the tire 202 in which the ratio (H2/H1) is small, an outline (also referred to as a carcass line) of the carcass 214 in a zone from the maximum width position PW to the end 248 of the apex 246 is represented as an arc having an appropriate radius of curvature. In the tire 202, strain is less likely to concentrate on the carcass 214 also in the sidewall 206 portions. In the tire 202, the carcass 214 is less likely to be damaged. The tire 202 is excellent in durability. In this viewpoint, the ratio (H2/H1) is preferably not greater than 1.2 and more preferably not greater than 1.1.

The clinch 208 comes into contact with the flange F of the rim R. The clinches 208 are required to have wear resistance in order to prevent reduction of volume due to rubbing against the flange F. The fillers 210 are layered over the clinches 208, whereby balance between stiffness of the clinch 208 and stiffness of the filler 210 is also important in view of concentration of strain. From the viewpoint of balance in wear resistance and stiffness, a ratio (E*c/E*f), in percentage, of the complex elastic modulus E*c of the clinch 208 to the complex elastic modulus E*f of the filler 210 is preferably greater than or equal to 70% and preferably not greater than 125%.

In the tire 202, a ratio (H2/Hf) of the height H2 to the height Hf is preferably greater than or equal to 0.25 and preferably not greater than 0.5. When the ratio is set to be greater than or equal to 0.25, a degree of curve, of the first turned-up portion 250b and the second main portion 252a, between the second reference line L2 and the core 244 is appropriately maintained. In the tire 202, the carcass 214 is sufficiently tensioned. The carcass 214 contributes to stiffness. Therefore, even if the tire 202 is under a heavy load, flexure in the bead 212 portion is reduced. Further, reduction of flexure inhibits concentration of strain and heat generation. In the tire 202, the bead 212 portions are less likely to be damaged. The tire 202 is excellent in durability. When the ratio is set to be not greater than 0.5, the carcass line in the zone from the maximum width position PW to the end 248 of the apex 246 is represented as an arc having an appropriate radius of curvature. In the tire 202, strain is less likely to concentrate on the carcass 214 also in the sidewall 206 portions. In the tire 202, the carcass 214 is less likely to be damaged. The tire 202 is excellent in durability.

In the tire 202, at a position (hereinafter, referred to as a position at the thickness Tcx) at which the clinch 208 has the maximum thickness Tcx, the filler 210 has the thickness Tf1, and the filler 210 contributes to pliable flexure in the bead 212 portion. Near the position at the thickness Tcx, the filler 210 has the maximum thickness Tfx, whereby the carcass 214 is sufficiently tensioned, and the outline of the carcass 214 contributes to pliable flexure of the entirety of the tire 202 as well as the bead 212 portions. In the tire 202, concentration of strain is less likely to occur. Also in the tread 204, heat generation is inhibited from partially occurring.

In the tire 202, the outer end 242 of the filler 210 is preferably disposed inward or outward of the outer end 234 of the clinch 208 in the radial direction. In other words, the outer end 242 of the filler 210 is preferably unequal to the outer end 234 of the clinch 208 in the radial direction. Thus, strain due to flexure is dispersed so as to occur at the outer end 242 of the filler 210 and the outer end 234 of the clinch 208, which are disposed at different positions, respectively. Dispersion of strain contributes to improvement of durability of the tire 202. In FIG. 7, a double-headed arrow Ds represents a distance, in the radial direction, from the outer end 234 of the clinch 208 to the outer end 242 of the filler 210. From the viewpoint of durability, the distance Ds is preferably greater than or equal to 5 mm in both a case where the outer end 242 of the filler 210 is disposed inward of the outer end 234 of the clinch 208 in the radial direction and a case where the outer end 242 of the filler 210 is disposed outward of the outer end 234 of the clinch 208 in the radial direction. From the viewpoint of dispersion of strain, the outer end 242 of the filler 210 is preferably distant from the outer end 234 of the clinch 208, whereby the upper limit of the distance Ds is not defined.

In the tire 202, the length Lf of the filler 210 is preferably greater than or equal to 10 mm and preferably not greater than 50 mm. When the length Lf is set to be greater than or equal to 10 mm, the fillers 210 contribute to stiffness. In the tire 202, even if the tire 202 is under a heavy load, flexure in the bead 212 portion is reduced. Further, reduction of flexure inhibits concentration of strain and heat generation. In the tire 202, the bead 212 portions are less likely to be damaged. The tire 202 is excellent in durability.

When the length Lf is set to be not greater than 50 mm, stiffness is appropriately maintained in a portion inward of the maximum width position PW. Pliable flexure occurs in the entirety of the tire 202. In the tire 202, concentration of strain is less likely to occur. Also in the tread 204, heat generation is inhibited from partially occurring. This contributes also to improvement of high-speed durability in the tread 204. Further, in the tire 202, strain is less likely to concentrate on the outer end 242 of the filler 210 and the end 254 of the first turned-up portion 250b. The tire 202 is excellent in durability.

In the tire 202, the height Hc of the clinch 208 is preferably greater than or equal to 30 mm and preferably not greater than 60 mm. When the height Hc is set to be greater than or equal to 30 mm, the sidewall 206 that is more flexible than the clinch 208 is prevented from contacting with the flange F. In the tire 202, damage (also referred to as rim chafing) in which volume of the bead 212 portion is reduced due to rubbing against the flange F is prevented. When the height Hc is set to be not greater than 60 mm, stiffness is appropriately maintained in a portion inward of the maximum width position PW. Pliable flexure occurs in the entirety of the tire 202. Further, in the tire 202, strain is less likely to concentrate on the outer end 234 of the clinch 208 and the end 254 of the first turned-up portion 250b. The tire 202 is excellent in durability.

In the present invention, the complex elastic modulus $E^*c$ of the clinch 208, the complex elastic modulus $E^*f$ of the filler 210, and the complex elastic modulus $E^*a$ of the apex 246 are measured in compliance with the standard of "JIS K 6394" by using the viscoelasticity spectrometer (trade name "VESF-3" manufactured by Iwamoto Seisakusho) under the following measurement conditions. In this measurement, plate-shaped test pieces (length=45 mm, width=4 mm, thickness=2 mm) are formed from rubber compositions of the apex 246, the filler 210, and the clinch 208. The test pieces are used in the measurement.
Initial strain: 10%
Amplitude: ±2.0%
Frequency: 10 Hz
Deformation mode: tension
Measurement temperature: 70° C.

EXAMPLES

Hereinafter, effects of the present invention will become apparent according to examples. However, the present invention should not be restrictively construed based on the description of examples.

EXPERIMENT 1

Example 1

A tire shown in FIGS. 1 to 2 was produced. The size of the tire was LT265/75R16C. A carcass having an "HTU" structure was used. The cross-sectional height Hs was 200 mm, and a ratio (Ht/Hs) of the height Ht of the turned-up portion to the cross-sectional height Hs was 0.50. The complex elastic modulus $E^*a$ of the apex was 40 MPa. The length Lf of the filler was 40 mm. The height Hc of the clinch was 50 mm.

Comparative Example 1

Comparative example 1 was a conventional tire in which a carcass had an "HTU" structure. In comparative example 1, no fillers were used.

Examples 2 to 5

Tires of examples 2 to 5 were each obtained in the same manner as for example 1 except that the maximum thickness Tcx of the clinch, the thickness Tf1 of the filler, and the thickness TA of the tire were as indicated below in Table 1.

Examples 6 to 9 and Comparative Examples 2 to 3

Tires of examples 6 to 9 and comparative examples 2 to 3 were each obtained in the same manner as for example 1 except that the thickness Tcx and the thickness Tf1 were adjusted such that the ratio (Tf1/(Tf1+Tcx)) was as indicated below in Table 2.

Examples 10 to 15

Tires of examples 10 to 15 were each obtained in the same manner as for example 1 except that the ratio (H2/H1) was as indicated below in Table 3.

Examples 16 to 19 and Comparative Examples 4 to 5

Tires of examples 16 to 19 and comparative examples 4 to 5 were each obtained in the same manner as for example 1 except that the complex elastic modulus $E^*f$ of the filler was adjusted such that the percentage ($E^*f/E^*a$) was as indicated below in Table 4.

Examples 20 to 25

Tires of examples 20 to 25 were each obtained in the same manner for example 1 except that the complex elastic modulus E*c of the clinch was adjusted such that the percentage (E*c/E*f) was as indicated below in Table 5.

Example 26

A tire of example 26 was obtained in the same manner as for example 1 except that a carcass having an "LTU" structure replaced the carcass of example 1. As indicated in Table 6, the height Ht of the turned-up portion was 20 mm. The thickness TA of the tire was 17 mm.

Example 27

A tire of example 27 was obtained in the same manner as for example 26 except that the maximum thickness Tcx of the clinch, the thickness Tf1 of the filler, and the thickness TA of the tire were as indicated below in Table 6.

Comparative Example 6

Comparative example 6 was a conventional tire in which a carcass had an "LTU" structure. In comparative example 6, no fillers were used.

Examples 28 to 30 and Comparative Examples 7 to 8

Tires of examples 28 to 30 and comparative examples 7 to 8 were each obtained in the same manner as for example 26 except that the thickness Tcx and the thickness Tf1 were adjusted such that the ratio (Tf1/(Tf1+Tcx)) was as indicated below in Table 7.

[Durability]

Each tire was mounted on a normal rim (size=7.5J), and was inflated with air to an internal pressure of 550 kPa. The tire was mounted to a drum-type tire testing machine, and a vertical load of 18.75 kN was applied to the tire. Running with the tire at a speed of 80 km/h on a drum having a radius of 1.7 m was performed. A running distance was measured until the tire was broken. The results are each indicated below as an index in Tables 1 to 7. The greater the value of the index is, the better the result is. The tire having the value of the index which is greater than or equal to 95, is estimated to be acceptable.

[Weight]

The weight of one tire was measured. The results are each indicated below in Tables 1 to 7 as an index with the result of comparative example 1 being 100. The less the value of the index is, the better the result is.

[Cost]

Cost required for producing one tire was calculated. The results are each indicated below in Tables 1 to 7 as an index with the result of comparative example 1 being 100. The less the value of the index is, the better the result is.

TABLE 1

Evaluation result

|  |  | Comp. ex. 1 | Ex. 2 | Ex. 3 | Ex. 4 | Ex. 1 | Ex. 5 |
|---|---|---|---|---|---|---|---|
| Carcass | Ht/Hs [-] | 0.50 | 0.50 | 0.50 | 0.50 | 0.50 | 0.50 |
| Apex | La [mm] | 45 | 10 | 10 | 10 | 10 | 10 |
| Filler | E*f/E*a [%] | — | 100 | 100 | 100 | 100 | 100 |
|  | Tf1 [mm] | — | 3.0 | 4.0 | 5.5 | 7.0 | 8.0 |

TABLE 1-continued

Evaluation result

|  |  | Comp. ex. 1 | Ex. 2 | Ex. 3 | Ex. 4 | Ex. 1 | Ex. 5 |
|---|---|---|---|---|---|---|---|
| Clinch | E*c/E*f [%] | — | 80 | 80 | 80 | 80 | 80 |
|  | Tcx [mm] | — | 3.0 | 4.0 | 5.5 | 7.0 | 8.0 |
|  | Tf1/(Tf1 + Tcx) [-] | — | 0.50 | 0.50 | 0.50 | 0.50 | 0.50 |
|  | H2/H1 [-] | — | 0.75 | 0.75 | 0.75 | 0.75 | 0.75 |
|  | TA [mm] | 18 | 10 | 12 | 15 | 18 | 20 |
|  | Durability | 100 | 104 | 108 | 109 | 110 | 111 |
|  | Weight | 100 | 96 | 98 | 99 | 100 | 102 |
|  | Cost | 100 | 96 | 98 | 99 | 100 | 102 |

TABLE 2

Evaluation result

|  |  | Comp. ex. 2 | Ex. 6 | Ex. 7 | Ex. 8 | Ex. 9 | Comp. ex. 3 |
|---|---|---|---|---|---|---|---|
| Carcass | Ht/Hs [-] | 0.50 | 0.50 | 0.50 | 0.50 | 0.50 | 0.50 |
| Apex | La [mm] | 10 | 10 | 10 | 10 | 10 | 10 |
| Filler | E*f/E*a [%] | 100 | 100 | 100 | 100 | 100 | 100 |
|  | Tf1 [mm] | 1.0 | 2.0 | 2.8 | 4.9 | 8.4 | 10.0 |
| Clinch | E*c/E*f [%] | 80 | 80 | 80 | 80 | 80 | 80 |
|  | Tcx [mm] | 13.0 | 12.0 | 11.2 | 9.1 | 5.6 | 4.0 |
|  | Tf1/(Tf1 + Tcx) [-] | 0.071 | 0.14 | 0.20 | 0.35 | 0.60 | 0.71 |
|  | H2/H1 [-] | 0.75 | 0.75 | 0.75 | 0.75 | 0.75 | 0.75 |
|  | TA [mm] | 18 | 18 | 18 | 18 | 18 | 18 |
|  | Durability | 101 | 106 | 108 | 109 | 103 | 93 |
|  | Weight | 100 | 100 | 100 | 100 | 100 | 100 |
|  | Cost | 100 | 100 | 100 | 100 | 100 | 100 |

TABLE 3

Evaluation result

|  |  | Ex. 10 | Ex. 11 | Ex. 12 | Ex. 13 | Ex. 14 | Ex. 15 |
|---|---|---|---|---|---|---|---|
| Carcass | Ht/Hs [-] | 0.50 | 0.50 | 0.50 | 0.50 | 0.50 | 0.50 |
| Apex | La [mm] | 10 | 10 | 10 | 10 | 10 | 10 |
| Filler | E*f/E*a [%] | 100 | 100 | 100 | 100 | 100 | 100 |
|  | Tf1 [mm] | 7.0 | 7.0 | 7.0 | 7.0 | 7.0 | 7.0 |
| Clinch | E*c/E*f [%] | 80 | 80 | 80 | 80 | 80 | 80 |
|  | Tcx [mm] | 7.0 | 7.0 | 7.0 | 7.0 | 7.0 | 7.0 |
|  | Tf1/(Tf1 + Tcx) [-] | 0.50 | 0.50 | 0.50 | 0.50 | 0.50 | 0.50 |
|  | H2/H1 [-] | 0.60 | 0.70 | 0.85 | 1.0 | 1.1 | 1.2 |
|  | TA [mm] | 18 | 18 | 18 | 18 | 18 | 18 |
|  | Durability | 103 | 106 | 110 | 109 | 105 | 102 |
|  | Weight | 100 | 100 | 100 | 100 | 100 | 100 |
|  | Cost | 100 | 100 | 100 | 100 | 100 | 100 |

TABLE 4

Evaluation result

|  |  | Comp. ex. 4 | Ex. 16 | Ex. 17 | Ex. 18 | Ex. 19 | Comp. ex. 5 |
|---|---|---|---|---|---|---|---|
| Carcass | Ht/Hs [-] | 0.50 | 0.50 | 0.50 | 0.50 | 0.50 | 0.50 |

TABLE 4-continued

Evaluation result

|  |  | Comp. ex. 4 | Ex. 16 | Ex. 17 | Ex. 18 | Ex. 19 | Comp. ex. 5 |
|---|---|---|---|---|---|---|---|
| Apex | La [mm] | 10 | 10 | 10 | 10 | 10 | 10 |
| Filler | E*f/E*a [%] | 60 | 70 | 90 | 110 | 125 | 130 |
|  | Tf1 [mm] | 7.0 | 7.0 | 7.0 | 7.0 | 7.0 | 7.0 |
| Clinch | E*c/E*f [%] | 80 | 80 | 80 | 80 | 80 | 80 |
|  | Tcx [mm] | 7.0 | 7.0 | 7.0 | 7.0 | 7.0 | 7.0 |
| Tf1/(Tf1 + Tcx) [-] |  | 0.50 | 0.50 | 0.50 | 0.50 | 0.50 | 0.50 |
| H2/H1 [-] |  | 0.75 | 0.75 | 0.75 | 0.75 | 0.75 | 0.75 |
| TA [mm] |  | 18 | 18 | 18 | 18 | 18 | 18 |
| Durability |  | 96 | 106 | 108 | 111 | 109 | 101 |
| Weight |  | 100 | 100 | 100 | 100 | 100 | 100 |
| Cost |  | 100 | 100 | 100 | 100 | 100 | 100 |

TABLE 5

Evaluation result

|  |  | Ex. 20 | Ex. 21 | Ex. 22 | Ex. 23 | Ex. 24 | Ex. 25 |
|---|---|---|---|---|---|---|---|
| Carcass | Ht/Hs [-] | 0.50 | 0.50 | 0.50 | 0.50 | 0.50 | 0.50 |
| Apex | La [mm] | 10 | 10 | 10 | 10 | 10 | 10 |
| Filler | E*f/E*a [%] | 100 | 100 | 100 | 100 | 100 | 100 |
|  | Tf1 [mm] | 7.0 | 7.0 | 7.0 | 7.0 | 7.0 | 7.0 |
| Clinch | E*c/E*f [%] | 60 | 70 | 90 | 100 | 125 | 130 |
|  | Tcx [mm] | 7.0 | 7.0 | 7.0 | 7.0 | 7.0 | 7.0 |
| Tf1/(Tf1 + Tcx) [-] |  | 0.50 | 0.50 | 0.50 | 0.50 | 0.50 | 0.50 |
| H2/H1 [-] |  | 0.75 | 0.75 | 0.75 | 0.75 | 0.75 | 0.75 |
| TA [mm] |  | 18 | 18 | 18 | 18 | 18 | 18 |
| Durability |  | 102 | 104 | 109 | 108 | 107 | 103 |
| Weight |  | 100 | 100 | 100 | 100 | 100 | 100 |
| Cost |  | 100 | 100 | 100 | 100 | 100 | 100 |

TABLE 6

Evaluation result

|  |  | Comp. ex. 6 | Ex. 27 | Ex. 26 |
|---|---|---|---|---|
| Carcass | Ht [mm] | 20 | 20 | 20 |
| Apex | La [mm] | 45 | 10 | 10 |
| Filler | E*f/E*a [%] | — | 100 | 100 |
|  | Tf1 [mm] | — | 5.5 | 7.0 |
| Clinch | E*c/E*f [%] | — | 80 | 80 |
|  | Tcx [mm] | — | 5.5 | 7.0 |
| Tf1/(Tf1 + Tcx) [—] |  | — | 0.50 | 0.50 |
| H2/H1 [—] |  | — | 0.75 | 0.75 |
| TA [mm] |  | 17 | 14 | 17 |
| Durability |  | 90 | 99 | 100 |
| Weight |  | 90 | 88 | 90 |
| Cost |  | 90 | 88 | 90 |

TABLE 7

Evaluation result

|  |  | Comp. ex. 7 | Ex. 28 | Ex. 29 | Ex. 30 | Comp. ex. 8 |
|---|---|---|---|---|---|---|
| Carcass | Ht [mm] | 20 | 20 | 20 | 20 | 20 |
| Apex | La [mm] | 10 | 10 | 10 | 10 | 10 |
| Filler | E*f/E*a [%] | 100 | 100 | 100 | 100 | 100 |
|  | Tf1 [mm] | 1.0 | 2.0 | 2.8 | 8.4 | 10.0 |
| Clinch | E*c/E*f [%] | 100 | 100 | 100 | 100 | 100 |
|  | Tcx [mm] | 13.0 | 12.0 | 11.2 | 5.6 | 4.0 |
| Tf1/(Tf1 + Tcx) [-] |  | 0.077 | 0.14 | 0.20 | 0.60 | 0.71 |
| H2/H1 [-] |  | 0.75 | 0.75 | 0.75 | 0.75 | 0.75 |
| TA [mm] |  | 17 | 17 | 17 | 17 | 17 |
| Durability |  | 90 | 96 | 97 | 97 | 90 |
| Weight |  | 90 | 90 | 90 | 90 | 90 |
| Cost |  | 90 | 90 | 90 | 90 | 90 |

As indicated in Tables 1 to 7, evaluation is higher in the tires of examples than in the tires of comparative examples. This evaluation result clearly indicates that the present invention is superior. In comparative examples 3 and 8, the outer appearance was observed after the evaluation of durability, and it was confirmed that loosening (ply turn loosening (PTL)) occurred in the end of the turned-up portion.

EXPERIMENT 2

Example 101

A tire shown in FIGS. 3 to 5 was produced. The specifications of the tire are indicated in Table 8. The size of the tire was LT265/75R16C. A carcass having an "HTU" structure was used. The cross-sectional height Hs was 200 mm, and a ratio (Ht/Hs) of the height Ht of the turned-up portion to the cross-sectional height Hs was 0.50. The width TD of a gap in the band was uniform. Each of the complex elastic modulus E*a of the apex and the complex elastic modulus E*f of the filler was 40 MPa. The length Lf of the filler was 40 mm. The height Hc of the clinch was 50 mm. The complex elastic modulus E*c of the clinch was 32 MPa. The ratio (H2/H1) was 0.75. The thickness TA was 14 mm.

Comparative Example 101

A tire of comparative example 101 had no fillers. The tire had conventional beads. Further, in the tire, the band had no gaps between cross-sections of the tape. The other structures were the same as for example 101. Thus, the tire of comparative example 101 was obtained. The tire was a conventional tire.

Comparative Example 102

A tire of comparative example 102 was obtained in the same manner as for example 101 except that the band had no gaps between cross-sections of the tape.

Comparative Example 103

A tire of comparative example 103 was obtained in the same manner as for example 101 except that no fillers were provided and conventional beads were used.

Examples 102 to 106

Tires of examples 102 to 106 were each obtained in the same manner as for example 101 except that the width TD of the gap was as indicated below in Table 9.

Examples 107 to 111

Tires of examples 107 to 111 were each obtained in the same manner as for example 101 except that the width TW of the tape was as indicated below in Table 10.

Examples 112 to 115 and Comparative Examples 104 to 105

Tires of examples 112 to 115 and comparative examples 104 to 105 were each obtained in the same manner as for example 101 except that the complex elastic modulus $E^*f$ of the filler was adjusted such that the percentage $(E^*f/E^*a)$ was as indicated below in Table 11.

Examples 116 to 119

Tires of examples 116 to 119 were each obtained in the same manner as for example 101 except that the thickness Tcx and the thickness Tf1 were adjusted such that the ratio (Tf1/(Tf1+Tcx)) was as indicated below in Table 12.

[Resistance to Flat Spot]

The sample tires were each mounted on a rim (size: 7.5J), and a radial force variation (RFV) of the tire was measured in compliance with JASO C607. The measured value was an initial RFV (F0) of the tire. Next, running with the tire at a speed of 60 km/h was preliminarily performed for one hour by using a drum tester. During the running, the internal air pressure of the tire was 550 kPa, and the load thereon was 18.75 kN. Next, the tire was left as it was for 16 hours in a stationary state. When the tire was left as it was, the internal air pressure of the tire was 550 kPa, and the load thereon was 18.75 kN. By the tire being left as it was, flat spot occurred in the tire. Next, an RFV of the tire in which the flat spot occurred was measured in compliance with JASO C607. The measured value was an RFV (F1) in the case of occurrence of flat spot. Next, running with the tire in which the flat spot occurred was performed for six minutes under the running conditions described above, and recovery from the flat spot was performed. An RFV of the tire was measured after running and recovery. The measured value was an RFV (F2) after recovery from the flat spot. By F2 being subtracted from F1, an amount of recovery of the RFV was calculated. The results are each indicated in Tables 8 to 12 as an index with the amount of recovery of comparative example 101 being 100.

[High-Speed Durability]

High-speed durability was evaluated in compliance with the standard of ECE30. A speed (km/h) at which the sample tire was damaged, was obtained. The results are each indicated in Tables 8 to 12 as an index with the speed of comparative example 101 being 100. The greater the value of the index is, the more excellent high-speed durability is.

[Durability]

Each tire was mounted on a normal rim (size=7.5J), and was inflated with air to an internal pressure of 550 kPa. The tire was mounted to a drum-type tire testing machine, and a vertical load of 18.75 kN was applied to the tire. Running with the tire at a speed of 80 km/h on a drum having a radius of 1.7 m was performed. A running distance was measured until the tire was broken. The results are each indicated below in Tables 8 to 12 as an index with the result of comparative example 101 being 100. The greater the value of the index is, the better the result is. The tire having the value of the index which is greater than or equal to 95, is estimated to be acceptable.

[Forming Time]

A time required in the tire forming step was measured. An inverse of the value of the result is indicated below in Tables 8 to 12 as an index with the result of comparative example 101 being 100. The less the value of the index is, the better the result is.

TABLE 8

| | | Evaluation result | | | |
|---|---|---|---|---|---|
| | | Comp. ex. 101 | Comp. ex. 102 | Comp. ex. 103 | Ex. 101 |
| Carcass Band | Ht/Hs [—] | 0.50 | 0.50 | 0.50 | 0.50 |
| | TW [mm] | 10 | 10 | 10 | 10 |
| | TD [mm] | 0 | 0 | 9 | 9 |
| | TD/TW [%] | 0 | 0 | 90 | 90 |
| Apex Filler | La [mm] | 45 | 10 | 45 | 10 |
| | E*f/E*a [%] | — | 100 | — | 100 |
| | Tf1 [mm] | — | 7.0 | — | 7.0 |
| Clinch | Tcx [mm] | — | 7.0 | — | 7.0 |
| | Tf1/(Tf1 + Tcx) [—] | — | 0.50 | — | 0.50 |
| Resistance to flat spot | | 100 | 102 | 103 | 107 |
| High-speed durability | | 100 | 100 | 98 | 98 |
| Durability | | 100 | 110 | 100 | 110 |
| Forming time | | 100 | 100 | 104 | 104 |

TABLE 9

| | | Evaluation result | | | | |
|---|---|---|---|---|---|---|
| | | Ex. 102 | Ex. 103 | Ex. 104 | Ex. 105 | Ex. 106 |
| Carcass Band | Ht/Hs [-] | 0.50 | 0.50 | 0.50 | 0.50 | 0.50 |
| | TW [mm] | 10 | 10 | 10 | 10 | 10 |
| | TD [mm] | 2 | 3 | 5 | 10 | 15 |
| | TD/TW [%] | 20 | 30 | 50 | 100 | 150 |
| Apex Filler | La [mm] | 10 | 10 | 10 | 10 | 10 |
| | E*f/E*a [%] | 100 | 100 | 100 | 100 | 100 |
| | Tf1 [mm] | 7.0 | 7.0 | 7.0 | 7.0 | 7.0 |
| Clinch | Tcx [mm] | 7.0 | 7.0 | 7.0 | 7.0 | 7.0 |
| | Tf1/(Tf1 + Tcx) [-] | 0.50 | 0.50 | 0.50 | 0.50 | 0.50 |
| Resistance to flat spot | | 102 | 104 | 105 | 107 | 108 |
| High-speed durability | | 100 | 99 | 99 | 97 | 92 |
| Durability | | 110 | 110 | 110 | 110 | 110 |
| Forming time | | 101 | 102 | 104 | 104 | 105 |

TABLE 10

| | | Evaluation result | | | | |
|---|---|---|---|---|---|---|
| | | Ex. 107 | Ex. 108 | Ex. 109 | Ex. 110 | Ex. 111 |
| Carcass Band | Ht/Hs [-] | 0.50 | 0.50 | 0.50 | 0.50 | 0.50 |
| | TW [mm] | 5 | 9 | 13 | 15 | 20 |
| | TD [mm] | 3 | 3 | 9 | 9 | 9 |
| | TD/TW [%] | 60 | 33 | 69 | 60 | 45 |
| Apex Filler | La [mm] | 10 | 10 | 10 | 10 | 10 |
| | E*f/E*a [%] | 100 | 100 | 100 | 100 | 100 |
| | Tf1 [mm] | 7.0 | 7.0 | 7.0 | 7.0 | 7.0 |
| Clinch | Tcx [mm] | 7.0 | 7.0 | 7.0 | 7.0 | 7.0 |
| | Tf1/(Tf1 + Tcx) [-] | 0.50 | 0.50 | 0.50 | 0.50 | 0.50 |
| Resistance to flat spot | | 105 | 104 | 106 | 105 | 102 |
| High-speed durability | | 99 | 99 | 99 | 99 | 99 |
| Durability | | 110 | 110 | 110 | 110 | 110 |
| Forming time | | 80 | 101 | 105 | 106 | 107 |

TABLE 11

Evaluation result

| | | Comp. ex. 104 | Ex. 112 | Ex. 113 | Ex. 114 | Ex. 115 | Comp. ex. 105 |
|---|---|---|---|---|---|---|---|
| Carcass | Ht/Hs [—] | 0.50 | 0.50 | 0.50 | 0.50 | 0.50 | 0.50 |
| Band | TW [mm] | 10 | 10 | 10 | 10 | 10 | 10 |
| | TD [mm] | 9 | 9 | 9 | 9 | 9 | 9 |
| | TD/TW [%] | 90 | 90 | 90 | 90 | 90 | 90 |
| Apex | La [mm] | 10 | 10 | 10 | 10 | 10 | 10 |
| Filler | E*f/E*a [%] | 60 | 70 | 90 | 110 | 125 | 130 |
| | Tfl [mm] | 7.0 | 7.0 | 7.0 | 7.0 | 7.0 | 7.0 |
| Clinch | Tcx [mm] | 7.0 | 7.0 | 7.0 | 7.0 | 7.0 | 7.0 |
| Tfl/(Tfl + Tcx) [—] | | 0.50 | 0.50 | 0.50 | 0.50 | 0.50 | 0.50 |
| Resistance to flat spot | | 98 | 102 | 107 | 107 | 106 | 100 |
| High-speed durability | | 95 | 97 | 98 | 98 | 98 | 96 |
| Durability | | 96 | 106 | 110 | 111 | 109 | 101 |
| Forming time | | 104 | 104 | 104 | 104 | 104 | 104 |

TABLE 12

Evaluation result

| | | Ex. 116 | Ex. 117 | Ex. 118 | Ex. 119 |
|---|---|---|---|---|---|
| Carcass | Ht/Hs [—] | 0.50 | 0.50 | 0.50 | 0.50 |
| Band | TW [mm] | 10 | 10 | 10 | 10 |
| | TD [mm] | 9 | 9 | 9 | 9 |
| | TD/TW [%] | 90 | 90 | 90 | 90 |
| Apex | La [mm] | 10 | 10 | 10 | 10 |
| Filler | E*f/E*a [%] | 100 | 100 | 100 | 100 |
| | Tfl [mm] | 2.0 | 2.8 | 8.4 | 10.0 |
| Clinch | Tcx [mm] | 12.0 | 11.2 | 5.6 | 4.0 |
| Tfl/(Tfl + Tcx) [—] | | 0.14 | 0.20 | 0.60 | 0.71 |
| Resistance to flat spot | | 104 | 105 | 106 | 104 |
| High-speed durability | | 97 | 98 | 98 | 96 |
| Durability | | 106 | 108 | 103 | 93 |
| Forming time | | 104 | 104 | 104 | 104 |

As indicated in Tables 8 to 12, the evaluation is higher in the tires of examples than in the tires of comparative examples. This evaluation result clearly indicates that the present invention is superior.

Experiment 3

Example 201

A tire shown in FIGS. 6 and 7 was produced. The specifications of the tire are indicated in Table 13. The size of the tire was "LT265/75R16 123/120Q". The cross-sectional height Hs was 200 mm, and a ratio (Ht/Hs) of the height Ht of the turned-up portion to the cross-sectional height Hs was 0.50. Each of the complex elastic modulus E*a of the apex and the complex elastic modulus E*f of the filler was 40 MPa. The complex elastic modulus E*c of the clinch was 32 MPa. The ratio (H2/H1) was 0.75.

Comparative Example 201

A tire of comparative example 201 had no fillers. The tire was a commercially-available conventional tire. The other structures were the same as for example 201.

Comparative Examples 202 to 203

Tires were each obtained in the same manner as for example 201 except that, as indicated in Table 13, a different mold was used, and the initial clip width Wc and the initial tread width Wt were different.

Examples 202 to 204

Tires were each obtained in the same manner as for example 201 except that, as indicated in Table 14, a different mold was used, and the initial clip width Wc and the initial tread width Wt were different.

Examples 205 to 206

Tires were each obtained in the same manner as for example 203 except that the length La of the apex was as indicated in Table 14.

Example 207

A tire was obtained in the same manner as for example 203 except that the length Lf of the filler was as indicated in Table 15.

Example 208

A tire was obtained in the same manner as for example 203 except that the height Hc of the clinch was as indicated in Table 15.

Examples 209 to 210

The height Hc and the thickness Tcx of the clinch were changed. The thickness Tcx and the thickness Tfl were adjusted such that the ratio (Tfl/(Tfl+Tcx)) was as indicated below in Table 15. The other structures were the same as for example 203. Thus, tires were obtained.

[Durability]

Each tire was mounted on a normal rim (size=7.5J), and was inflated with air to an internal pressure of 550 kPa. The tire was mounted to a drum-type tire testing machine, and a vertical load of 18.75 kN was applied to the tire. Running with the tire at a speed of 80 km/h on a drum having a radius of 1.7 m was performed. A running distance was measured until the tire was broken. The results are each indicated in Tables 13 to 15 as an index with the result of comparative example 201 being 100. The greater the value of the index is, the better the result is. The tire having the value of the index which is greater than or equal to 95, is estimated to be acceptable.

[Evaluation of Weight]

The weight of a single tire was measured. An index of the weight of each tire is indicated in Tables 13 to 15 with the weight of the tire of comparative example 201 being 100. The greater the index is, the greater the weight is. The less the index is, the better the evaluation is.

[Evaluation of Production Cost]

A time required in the tire forming step was measured. An inverse of the value of the result is indicated below in Tables 13 to 15 as an index with the result of comparative example 201 being 100. The less the value of the index is, the better the evaluation is.

[Evaluation of Air-in Performance]

The tires were stacked in the up-down direction such that the up-down direction corresponds to the axial direction of the tires. Seven tires of the same type as that of the tires for evaluation were stacked on the tires for evaluation. This state was maintained for two weeks. After that, the tires for evaluation were each mounted on a normal rim (size: 7.5J), and inflated with air. Whether or not the bead portion was brought into contact with a flange of the rim and disposed at an appropriate position when the tire was inflated with air, was determined for evaluation. When a tire for evaluation was able to be mounted on the rim and appropriately inflated with air as it was, the tire is evaluated as "good". When a tire for evaluation was not able to be sufficiently inflated with air as it was due to breakage being great, the tire is evaluated as "not good". The results are indicated in Tables 13 to 15.

TABLE 13

| | | Evaluation result | | | |
|---|---|---|---|---|---|
| | | Comp. example 201 | Comp. example 202 | Example 201 | Comp. example 203 |
| Filler | | not provided | provided | Provided | Provided |
| | Lf (mm) | — | 40 | 40 | 40 |
| | Tfl (mm) | — | 7 | 7 | 7 |
| Clinch | Hc (mm) | 50 | 50 | 50 | 50 |
| | Tcx (mm) | 7 | 7 | 7 | 7 |
| Apex | La (mm) | 45 | 18 | 18 | 18 |
| Bead portion | TA (mm) | 17 | 17 | 17 | 17 |
| Tfl/(Tfl+Tcx) | | — | 0.50 | 0.50 | 0.50 |
| Mold | Wc1 (mm) | 198 | 198 | 205 | 222 |
| | Wm1 (mm) | 250 | 250 | 250 | 250 |
| | Wt1 (mm) | 205 | 205 | 205 | 200 |
| | Wc1/Wm1 | 0.79 | 0.79 | 0.82 | 0.89 |
| | Wc1/Wt1 | 0.97 | 0.97 | 1.00 | 1.11 |
| Tire | Wc (mm) | 175 | 175 | 184 | 201 |
| | Wt (mm) | 205 | 205 | 205 | 200 |
| | Wc/Wt | 0.85 | 0.85 | 0.90 | 1.01 |
| Durability | | 100 | 110 | 110 | 90 |
| Weight | | 100 | 100 | 100 | 98 |
| Production cost | | 100 | 100 | 100 | 98 |
| Air-in performance | | not good | not good | good | good |

TABLE 14

| | | Evaluation result | | | | |
|---|---|---|---|---|---|---|
| | | Example 202 | Example 203 | Example 204 | Example 205 | Example 206 |
| Filler | | Provided | provided | Provided | Provided | provided |
| | Lf (mm) | 40 | 40 | 40 | 40 | 40 |
| | Tfl (mm) | 7 | 7 | 7 | 7 | 7 |
| Clinch | Hc (mm) | 50 | 50 | 50 | 50 | 50 |
| | Tcx (mm) | 7 | 7 | 7 | 7 | 7 |
| Apex | La (mm) | 18 | 18 | 18 | 5 | 25 |
| Bead portion | TA (mm) | 17 | 17 | 17 | 17 | 17 |
| Tfl/(Tfl + Tcx) | | 0.50 | 0.50 | 0.50 | 0.50 | 0.50 |
| Mold | Wc1 (mm) | 212 | 210 | 215 | 210 | 210 |

TABLE 14-continued

| | | Evaluation result | | | | |
|---|---|---|---|---|---|---|
| | | Example 202 | Example 203 | Example 204 | Example 205 | Example 206 |
| | Wm1 (mm) | 264 | 250 | 250 | 250 | 250 |
| | Wt1 (mm) | 204 | 205 | 205 | 205 | 205 |
| | Wc1/Wm1 | 0.80 | 0.84 | 0.86 | 0.84 | 0.84 |
| | Wc1/Wt1 | 1.04 | 1.02 | 1.05 | 1.02 | 1.02 |
| Tire | Wc (mm) | 190 | 185 | 190 | 185 | 185 |
| | Wt (mm) | 204 | 205 | 205 | 205 | 205 |
| | Wc/Wt | 0.93 | 0.90 | 0.93 | 0.90 | 0.90 |
| Durability | | 95 | 106 | 100 | 95 | 95 |
| Weight | | 101 | 99 | 98 | 102 | 102 |
| Production cost | | 101 | 99 | 98 | 102 | 102 |
| Air-in performance | | good | good | good | good | good |

TABLE 15

| | | Evaluation result | | | |
|---|---|---|---|---|---|
| | | Example 207 | Example 208 | Example 209 | Example 210 |
| Filler | | Provided | provided | Provided | Provided |
| | Lf (mm) | 55 | 40 | 40 | 40 |
| | Tfl (mm) | 7 | 7 | 2.5 | 9 |
| Clinch | Hc (mm) | 50 | 65 | 65 | 65 |
| | Tcx (mm) | 7 | 7 | 11.5 | 5 |
| Apex | La (mm) | 18 | 18 | 18 | 18 |
| Bead portion | TA (mm) | 17 | 17 | 17 | 17 |
| Tfl/(Tfl+Tcx) | | 0.50 | 0.50 | 0.18 | 0.64 |
| Mold | Wc1 (mm) | 210 | 210 | 210 | 210 |
| | Wm1 (mm) | 250 | 250 | 250 | 250 |
| | Wt1 (mm) | 205 | 205 | 205 | 205 |
| | Wc1/Wm1 | 0.84 | 0.84 | 0.84 | 0.84 |
| | Wc1/Wt1 | 1.02 | 1.02 | 1.02 | 1.02 |
| Tire | Wc (mm) | 185 | 185 | 185 | 185 |
| | Wt (mm) | 205 | 205 | 205 | 205 |
| | Wc/Wt | 0.90 | 0.90 | 0.90 | 0.90 |
| Durability | | 95 | 95 | 95 | 95 |
| Weight | | 102 | 101 | 101 | 101 |
| Production cost | | 102 | 101 | 101 | 101 |
| Air-in performance | | good | good | good | good |

As indicted in Tables 13 to 15, evaluation is higher in the tires of examples than in the tires of comparative examples. This evaluation result clearly indicates that the present invention is superior.

INDUSTRIAL APPLICABILITY

The technique relating to the fillers as described above is applicable also to tires for various vehicles.

DESCRIPTION OF THE REFERENCE CHARACTERS 2, 102, 202 . . . tire
4, 104, 204 . . . tread
6, 106, 206 . . . sidewall
8, 108, 208 . . . clinch
10, 110, 210 . . . filler
12, 112, 212 . . . bead 14, 114, 214 . . . carcass
34, 134, 234 . . . outer end of clinch
36, 136, 236 . . . inner end of sidewall
38, 138, 238 . . . inner end of filler
40, 140, 240 . . . inner end of clinch
42, 142, 242 . . . outer end of filler
44, 144, 244 . . . core
46, 146, 246 . . . apex
48, 148, 248 . . . end of apex
50, 150, 250 . . . first carcass ply
50a, 150a, 250a . . . first main portion
50b, 150b, 250b . . . first turned-up portion
52, 152, 252 . . . second carcass ply
52a, 152a, 252a . . . second main portion
54, 154, 254 . . . end of first turned-up portion
56, 156, 256 . . . end of second carcass ply
120, 220 . . . band
162 . . . cross-section
164 . . . gap
262 . . . mold
264 . . . bladder
266 . . . tread segment
268 . . . upper side plate
270 . . . lower side plate
272 . . . upper bead ring
274 . . . lower bead ring

The invention claimed is:

1. A pneumatic tire comprising:
a tread;
a pair of sidewalls;
a pair of clinches;
a pair of fillers;
a pair of beads; and
a carcass,
wherein
the sidewalls extend inward from ends of the tread respectively,
the clinches are disposed inward of the sidewalls, respectively, in the radial direction,
the fillers are disposed inward of the clinches, respectively, in an axial direction, and each filler is tapered inward in the radial direction,
the beads are disposed inward of the fillers, respectively, in the radial direction,
the carcass is extended on and between one of the beads and the other of the beads along inner sides of the tread and the sidewalls,
the fillers are layered over the clinches in portions outward of the carcass in the axial direction,
the beads include cores and apexes that extend outward from the cores, respectively, in the radial direction,
the carcass includes a carcass ply,
the carcass ply is turned up around the cores from an inner side toward an outer side in the axial direction, and, by the turning-up, the carcass ply has a main portion and turned-up portions,
the turned-up portions are disposed between the fillers and the apexes,
each clinch has a maximum thickness Tcx that is measured along a line normal to an inner surface, in the axial direction, of the clinch,
when the normal line for the thickness Tcx is a first reference line,
a ratio of a thickness Tf1, of the filler, measured along the first reference line to a sum of the thickness Tf1 and the thickness Tcx is greater than or equal to 0.1 and not greater than 0.6, and
a percentage of a complex elastic modulus E*f of each filler relative to a complex elastic modulus E*a of each apex is greater than or equal to 70% and not greater than 125%,
a percentage of a complex elastic modulus E*c of the clinch relative to the complex elastic modulus E*f of the filler is greater than or equal to 70% and not greater than 125%, and
a complex elastic modulus E*f of the filler is higher than or equal to 15 MPa and not greater than 75 MPa.

2. The pneumatic tire according to claim 1, wherein
each filler has a maximum thickness Tfx that is measured along a line normal to the inner surface, in the axial direction, of the clinch, and
when the normal line for the thickness Tfx is a second reference line,
a ratio of a length, in the radial direction, from an inner end of the filler to a point of intersection of the second reference line and the inner surface, in the axial direction, of the clinch, relative to a length, in the radial direction, from the inner end of the filler to a point of intersection of the first reference line and the inner surface, in the axial direction, of the clinch, is greater than or equal to 0.6 and not greater than 1.2.

3. The pneumatic tire according to claim 1, wherein a thickness, of the tire, measured along the first reference line is greater than or equal to 10 mm and not greater than 20 mm.

4. A pneumatic tire comprising:
a tread;
a pair of sidewalls;
a pair of clinches;
a pair of fillers;
a pair of beads;
a carcass; and
a band,
wherein
the sidewalls extend inward from ends of the tread respectively in a radial direction,
the clinches are disposed inward of the sidewalls, respectively, in the radial direction,
the fillers are disposed inward of the clinches, respectively, in an axial direction,
the beads are disposed inward of the fillers, respectively, in the radial direction,
the carcass is extended on and between one of the beads and the other of the beads along inner sides of the tread and the sidewalls,
the fillers are layered over the clinches in portions outward of the carcass in the axial direction,
the band is disposed inward of the tread in a portion outward of the carcass in the radial direction,
the beads include cores and apexes that extend outward from the cores, respectively, in the radial direction,
the carcass includes a carcass ply,
the carcass ply is turned up around the cores from an inner side toward an outer side in the axial direction, and, by the turning-up, the carcass ply has a main portion and turned-up portions,
the turned-up portions are disposed between the fillers and the apexes,
a percentage of a complex elastic modulus E*f of each filler relative to a complex elastic modulus E*a of each apex is greater than or equal to 70% and not greater than 125%,
the band is formed by a tape, having a cord formed of organic fiber which extends in a length direction, being helically wound in a circumferential direction, and, on a cross-section obtained by cutting at a plane perpendicular to the circumferential direction of the tire, cross-sections of the tape are aligned in the axial direction, the tread exists outward of each end of the band, in the axial direction, gaps are formed between the cross-sections, of the tape, adjacent to each other, a percentage of a complex elastic modulus $E^*c$ of the clinch relative to the complex elastic modulus $E^*f$ of the filler is greater than or equal to 70% and not greater than 125%, and a complex elastic modulus $E^*f$ of the filler is higher than or equal to 15 MPa and not greater than 75 MPa.

5. The pneumatic tire according to claim 4, wherein a width TW of the tape is greater than or equal to 9 mm and not greater than 15 mm, and a width TD of each gap is greater than or equal to 3 mm and not greater than 9 mm.

6. The pneumatic tire according to claim 4, wherein each clinch has a maximum thickness Tcx that is measured along a line normal to an inner surface, in the axial direction, of the clinch, and when the normal line for the thickness Tcx is a first reference line, a ratio of a thickness Tf1, of the filler, measured along the first reference line, to a sum of the thickness Tf1 and the thickness Tcx, is greater than or equal to 0.1 and not greater than 0.6.

7. The pneumatic tire according to claim 4, wherein each filler has a maximum thickness Tfx that is measured along a line normal to the inner surface, in the axial direction, of the clinch, and when the normal line for the thickness Tfx is a second reference line, a ratio of a length, in the radial direction, from an inner end of the filler to a point of intersection of the second reference line and the inner surface, in the axial direction, of the clinch, relative to a length, in the radial direction, from the inner end of the filler to a point of intersection of the first reference line and the inner surface, in the axial direction, of the clinch, is greater than or equal to 0.6 and not greater than 1.2.

8. The pneumatic tire according to claim 4, wherein a thickness, of the tire, measured along the first reference line is greater than or equal to 10 mm and not greater than 20 mm.

9. A pneumatic tire comprising:

a tread;

a pair of sidewalls;

a pair of clinches;

a pair of fillers;

a pair of beads; and a carcass, wherein the sidewalls extend inward from ends of the tread respectively in a radial direction, the clinches are disposed inward of the sidewalls, respectively, in the radial direction, the fillers are disposed inward of the clinches, respectively, in an axial direction, and each filler is tapered inward in the radial direction, the fillers are layered over the clinches in portions outward of the carcass in the axial direction, and an inner surface, in the axial direction, of each filler is curved so as to project inward, the beads are disposed inward of the fillers, respectively, in the radial direction, and the beads include cores and apexes that extend outward from the cores, respectively, in the radial direction, the carcass is extended on and between one of the beads and the other of the beads along inner sides of the tread and the sidewalls, the carcass includes a carcass ply, the carcass ply is turned up around the cores from an inner side toward an outer side in the axial direction, and, by the turning-up, the carcass ply has a main portion and turned-up portions, the turned-up portions are disposed between the fillers and the apexes, each clinch has a maximum thickness Tcx that is measured along a line normal to an inner surface, in the axial direction, of the clinch, when the normal line for the thickness Tcx is a first reference line, a point PF of intersection of the first reference line and the inner surface, in the axial direction, of the filler is disposed axially inward of a mid-point of a thickness TA, of the tire, measured on the first reference line, a percentage of a complex elastic modulus $E^*c$ of the clinch relative to the complex elastic modulus $E^*f$ of the filler is greater than or equal to 70% and not greater than 125%, and a complex elastic modulus $E^*f$ of the filler is higher than or equal to 15 MPa and not greater than 75 MPa, and in a mold used for obtaining the tire by vulcanization-molding, a ratio of a clip width Wc1 of the mold to a maximum width Wm1 of the mold is greater than or equal to 0.80 and not greater than 0.90, and a ratio of the clip width Wc1 of the mold to a tread width Wt1 of the mold is greater than or equal to 0.95 and not greater than 1.10.

10. The tire according to claim 9, wherein the thickness TA is greater than or equal to 10 mm and not greater than 20 mm.

11. The tire according to claim 9, wherein a length La of the apex is greater than or equal to 5 mm and not greater than 20 mm.

12. The tire according to claim 9, wherein a ratio of a thickness Tf1, of the filler, measured along the first reference line, to a sum of the thickness Tcx and the thickness Tf1 is greater than or equal to 0.1 and not greater than 0.6.

13. The tire according to claim 9, wherein a percentage of a complex elastic modulus $E^*f$ of each filler relative to a complex elastic modulus $E^*a$ of each apex is greater than or equal to 70% and not greater than 125%.

14. The tire according to claim 9, wherein each filler has a maximum thickness Tfx that is measured along a line normal to the inner surface, in the axial direction, of the clinch, and when the normal line for the thickness Tfx is a second reference line, a ratio of a length, in the radial direction, from an inner end of the filler to a point of intersection of the second reference line and the inner surface, in the axial direction, of the clinch, relative to a length, in the radial direction, from the inner end of the filler to a point of intersection of the first reference line and the inner surface, in the axial direction, of the clinch, is greater than or equal to 0.6 and not greater than 1.2.

15. A pneumatic tire comprising:
a tread;
a pair of sidewalls;
a pair of clinches;
a pair of fillers;
a pair of beads; and
a carcass,
wherein
the sidewalls extend inward from ends of the tread respectively in a radial direction,
the clinches are disposed inward of the sidewalls, respectively, in the radial direction,
the fillers are disposed inward of the clinches, respectively, in an axial direction, and each filler is tapered inward in the radial direction, the fillers are layered over the clinches in portions outward of the carcass in the axial direction, and an inner surface, in the axial direction, of each filler is curved so as to project inward,
the beads are disposed inward of the fillers, respectively, in the radial direction, and the beads include cores and apexes that extend outward from the cores, respectively, in the radial direction,
the carcass is extended on and between one of the beads and the other of the beads along inner sides of the tread and the sidewalls,
the carcass includes a carcass ply,
the carcass ply is turned up around the cores from an inner side toward an outer side in the axial direction, and, by the turning-up, the carcass ply has a main portion and turned-up portions,
the turned-up portions are disposed between the fillers and the apexes,
each clinch has a maximum thickness Tcx that is measured along a line normal to an inner surface, in the axial direction, of the clinch,
when the normal line for the thickness Tcx is a first reference line, a point PF of intersection of the first reference line and the inner surface, in the axial direction, of the filler is disposed axially inward of a mid-point of a thickness TA, of the tire, measured on the first reference line,
a ratio of an initial clip width We to an initial tread width Wt is greater than or equal to 0.90 and not greater than 1.00 before the tire is mounted on a rim,
a percentage of a complex elastic modulus $E^*c$ of the clinch relative to the complex elastic modulus $E^*f$ of the filler is greater than or equal to 70% and not greater than 125%, and
a complex elastic modulus $E^*f$ of the filler is higher than or equal to 15 MPa and not greater than 75 MPa.

* * * * *